United States Patent
Kim

(10) Patent No.: US 10,808,609 B2
(45) Date of Patent: Oct. 20, 2020

(54) METHOD OF ASSEMBLING AND DISASSEMBLING GAS TURBINE AND GAS TURBINE ASSEMBLED THEREBY

(71) Applicant: DOOSAN HEAVY INDUSTRIES & CONSTRUCTION CO., LTD., Changwon-si, Gyeongsangnam-do (KR)

(72) Inventor: Kyung Kook Kim, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 122 days.

(21) Appl. No.: 15/974,694

(22) Filed: May 9, 2018

(65) Prior Publication Data

US 2019/0003381 A1     Jan. 3, 2019

(30) Foreign Application Priority Data

Jun. 28, 2017   (KR) .......................... 10-2017-0081722

(51) Int. Cl.
*F02C 3/06*     (2006.01)
*F01D 5/06*     (2006.01)

(52) U.S. Cl.
CPC ................. *F02C 3/06* (2013.01); *F01D 5/06* (2013.01); *F05D 2220/3212* (2013.01);
(Continued)

(58) Field of Classification Search
CPC ........... F01D 5/005; F01D 5/066; F01D 5/32; F05D 2230/70; F05D 2230/72; F05D 2230/80
See application file for complete search history.

(56) References Cited

U.S. PATENT DOCUMENTS

| 5,560,841 A * | 10/1996 | DeMichael | ............ B23K 11/22 219/85.1 |
| 8,636,890 B2 * | 1/2014 | Woodard | ............... C25D 7/008 205/115 |

(Continued)

FOREIGN PATENT DOCUMENTS

| JP | 2011-032900 A | 2/2011 |
| KR | 20160127686 A | 11/2016 |
| WO | 2016068857 A1 | 5/2016 |

OTHER PUBLICATIONS

A Korean Office Action dated Aug. 21, 2018 in connection with Korean Patent Application No. 10-2018-0058286 which corresponds to the above-referenced U.S. application.
(Continued)

*Primary Examiner* — Christopher M Koehler
(74) *Attorney, Agent, or Firm* — Invenstone Patent, LLC

(57) ABSTRACT

A method of assembling and disassembling a gas turbine carries out various disassembly and reassembly processes depending on circumstances. In one process, a first-stage blade assembly and a first-stage vane assembly of a turbine section are disassembled from a gas turbine by sequential steps of disassembling a combustor assembly; disassembling a first-stage vane assembly; and disassembling a first-stage blade assembly. In another process, a fourth-stage blade assembly of a turbine section is disassembled from a gas turbine by sequential steps of disassembling a diffuser loading slot from a rear diffuser; and disassembling a fourth-stage blade assembly from a turbine disk. In another process, a rear bearing assembly of a turbine section is disassembled from a gas turbine by sequential steps of disassembling a rear diffuser cover from a rear diffuser; and supporting one end of a rotor shaft and disassembling a rear bearing from a rotor shaft support.

10 Claims, 44 Drawing Sheets

(52) U.S. Cl.
CPC .. *F05D 2220/3215* (2013.01); *F05D 2230/60* (2013.01); *F05D 2230/70* (2013.01)

(56) References Cited

U.S. PATENT DOCUMENTS

| | | | | |
|---|---|---|---|---|
| 8,684,669 | B2* | 4/2014 | Chehab | F01D 11/122 |
| | | | | 415/118 |
| 2011/0000218 | A1* | 1/2011 | Arase | F01D 25/246 |
| | | | | 60/772 |
| 2012/0063914 | A1* | 3/2012 | Belmonte | F01D 5/066 |
| | | | | 416/244 A |
| 2012/0328423 | A1* | 12/2012 | Tanaka | F01D 5/08 |
| | | | | 415/182.1 |
| 2015/0321250 | A1* | 11/2015 | Xu | B23P 6/005 |
| | | | | 164/15 |
| 2016/0047263 | A1 | 2/2016 | Olejarski et al. | |
| 2017/0022843 | A1* | 1/2017 | Tanimura | F01D 25/30 |
| 2017/0089264 | A1 | 3/2017 | Jones et al. | |
| 2017/0211421 | A1* | 7/2017 | Takamura | F01D 9/041 |

OTHER PUBLICATIONS

A Korean Office Action dated Feb. 26, 2019 in connection with Korean Patent Application No. 10-2018-0058285 which corresponds to the above-referenced U.S. application.

A Korean Office Action dated Feb. 26, 2019 in connection with Korean Patent Application No. 10-2018-0058286 which corresponds to the above-referenced U.S. application.

* cited by examiner

[FIG. 1]
100
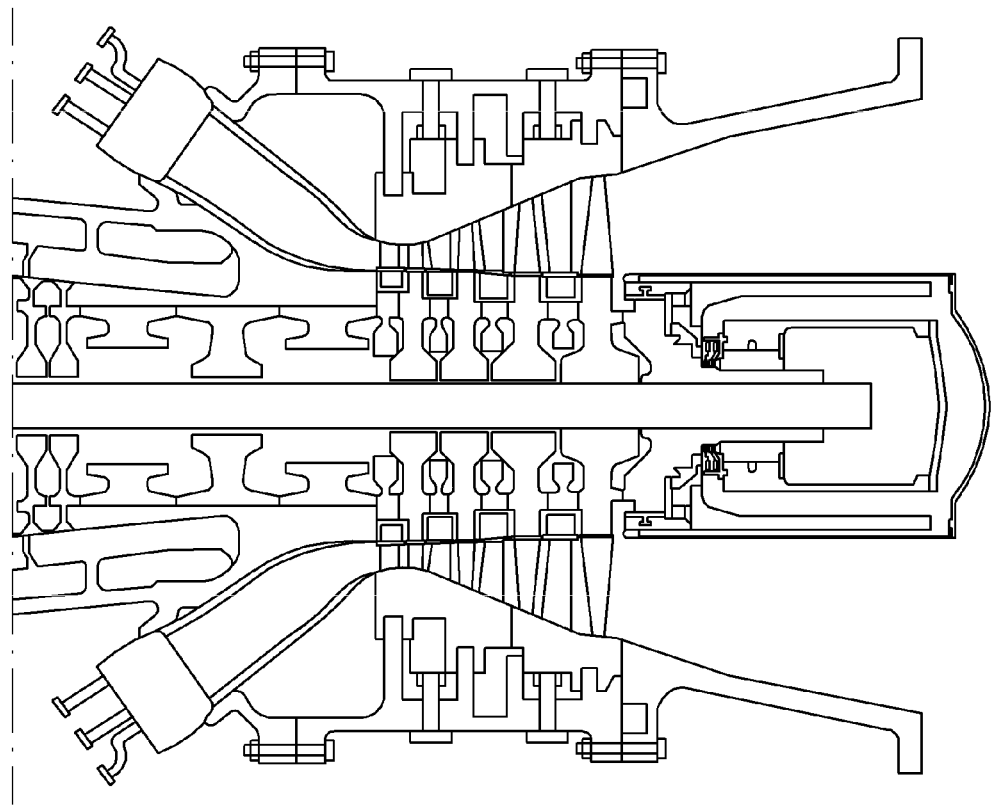

[FIG. 2]
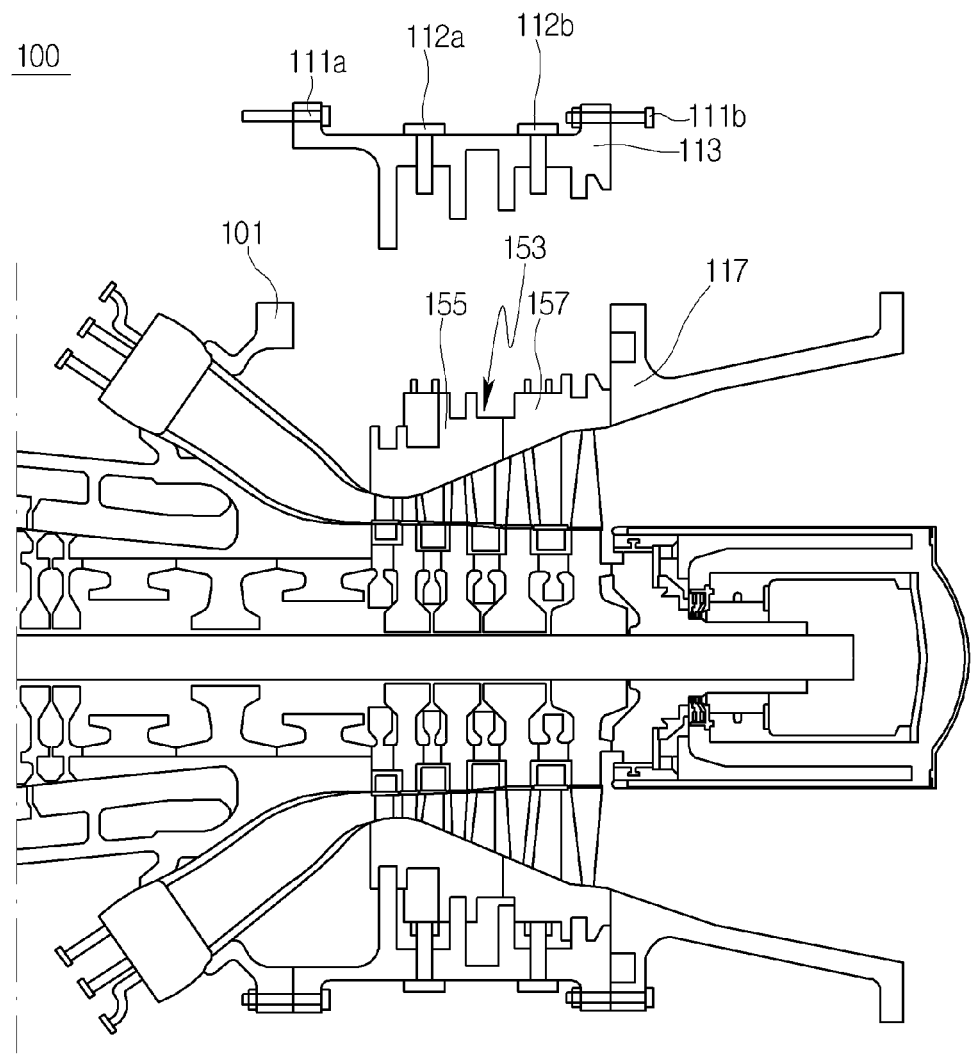

[FIG. 3]
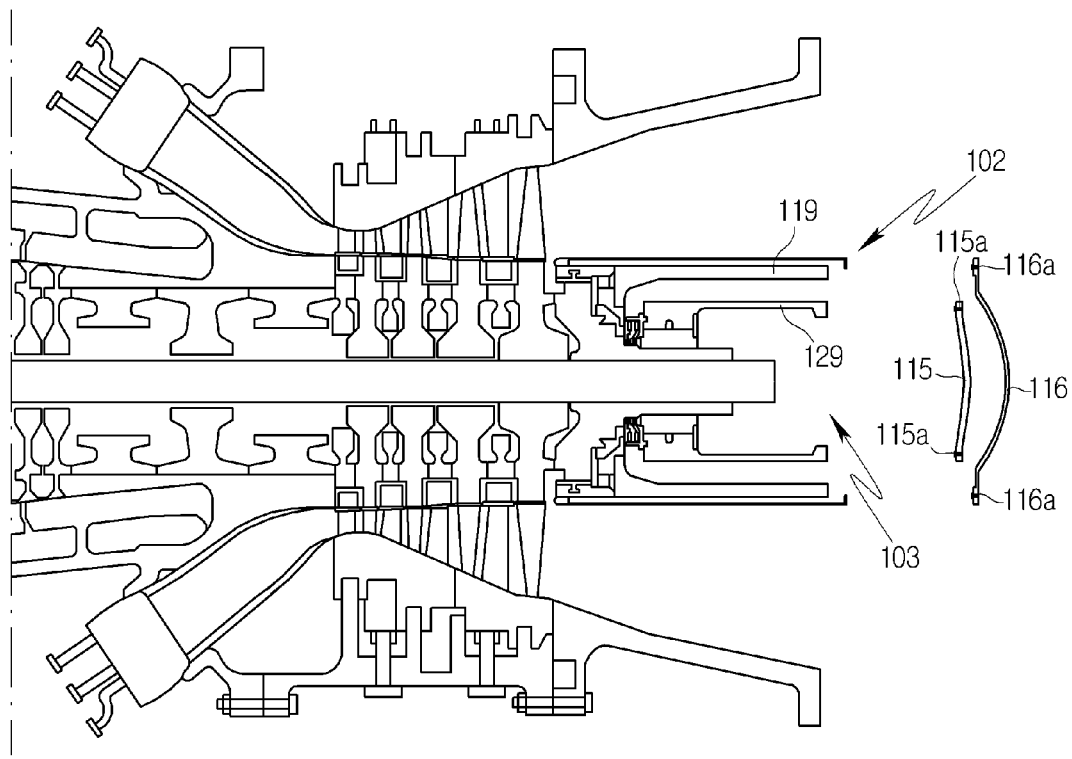

[FIG. 4]
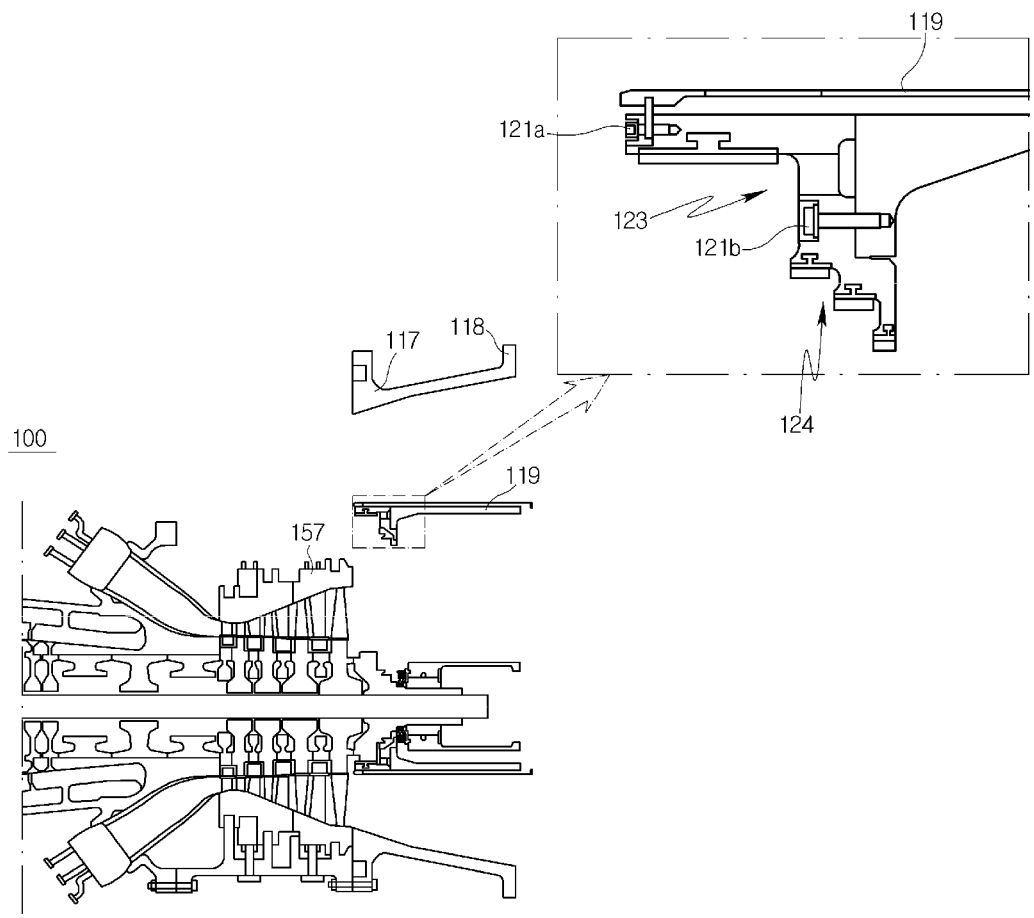

[FIG. 5]
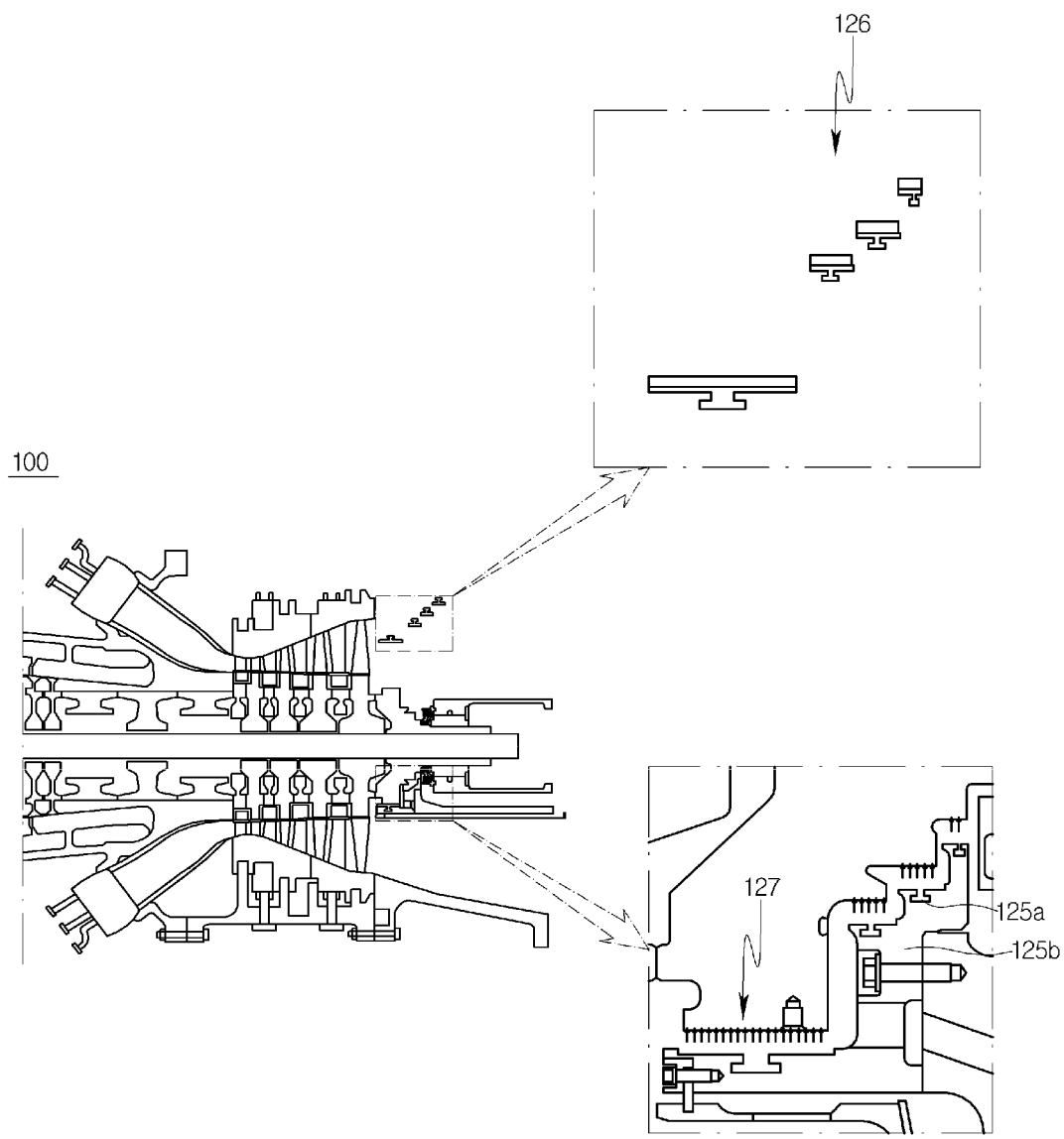

[FIG. 6]
100
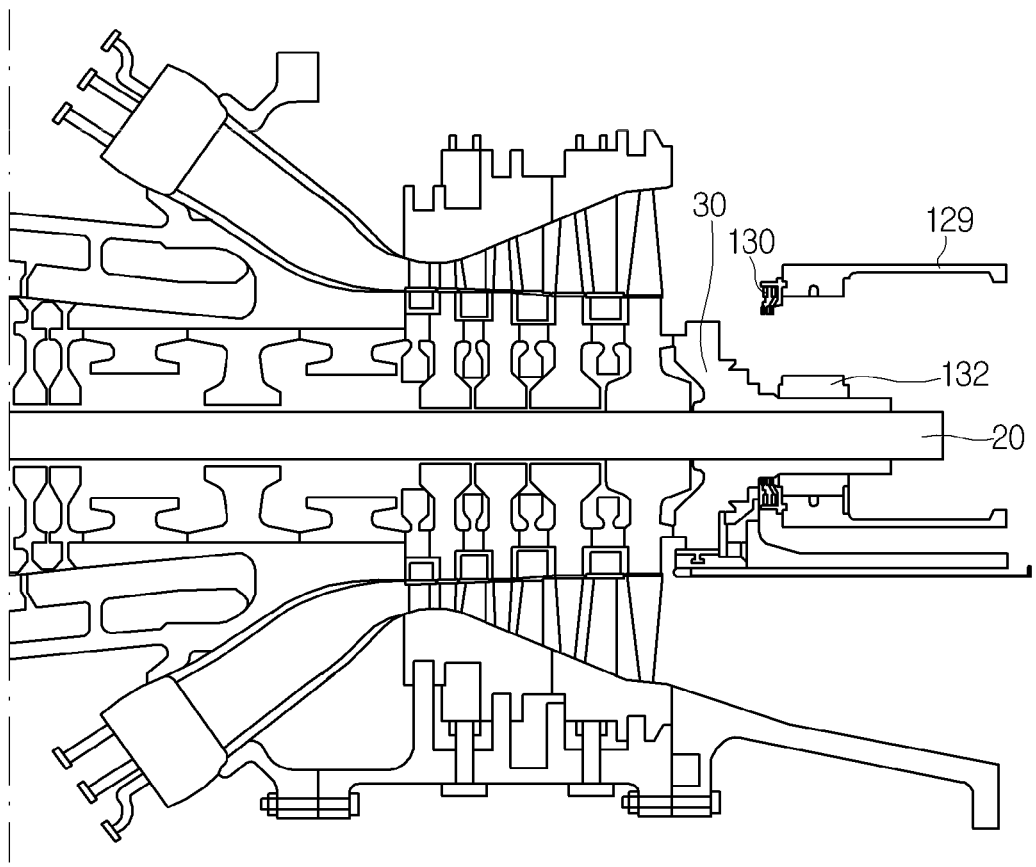

[FIG. 7]
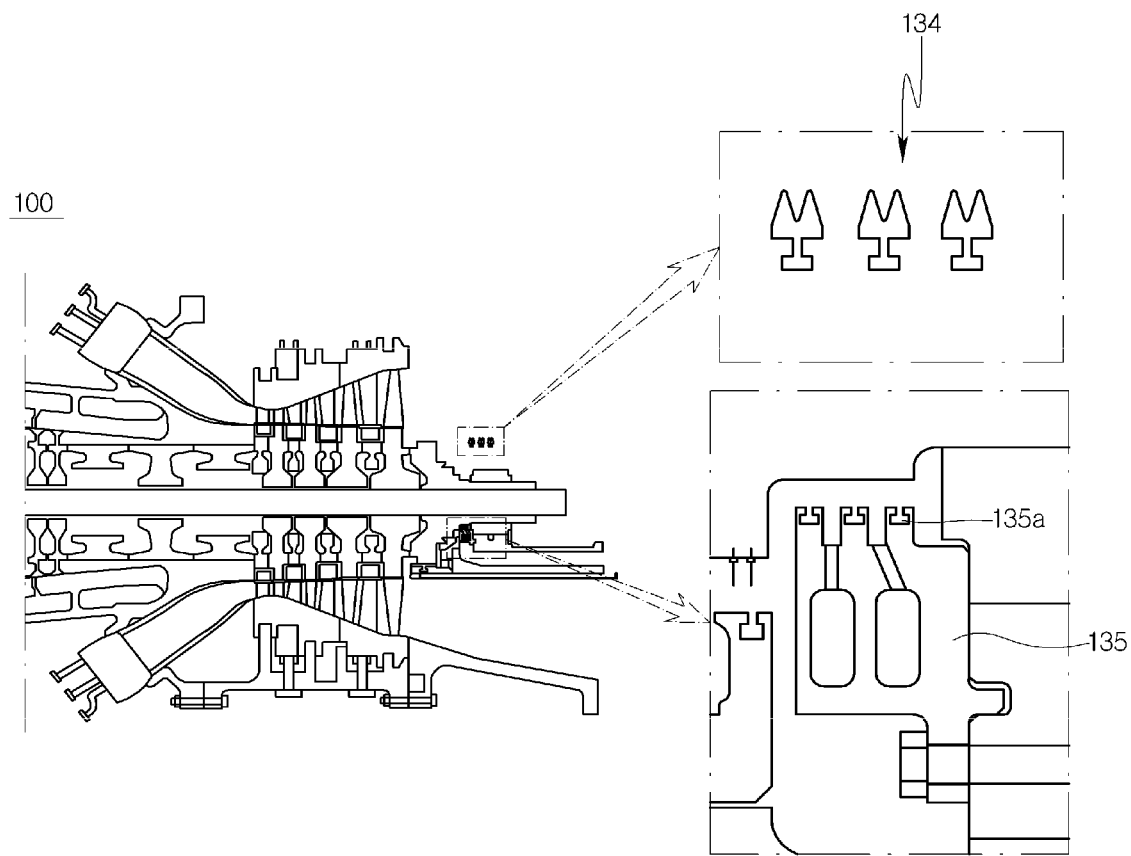

[FIG. 8]
100
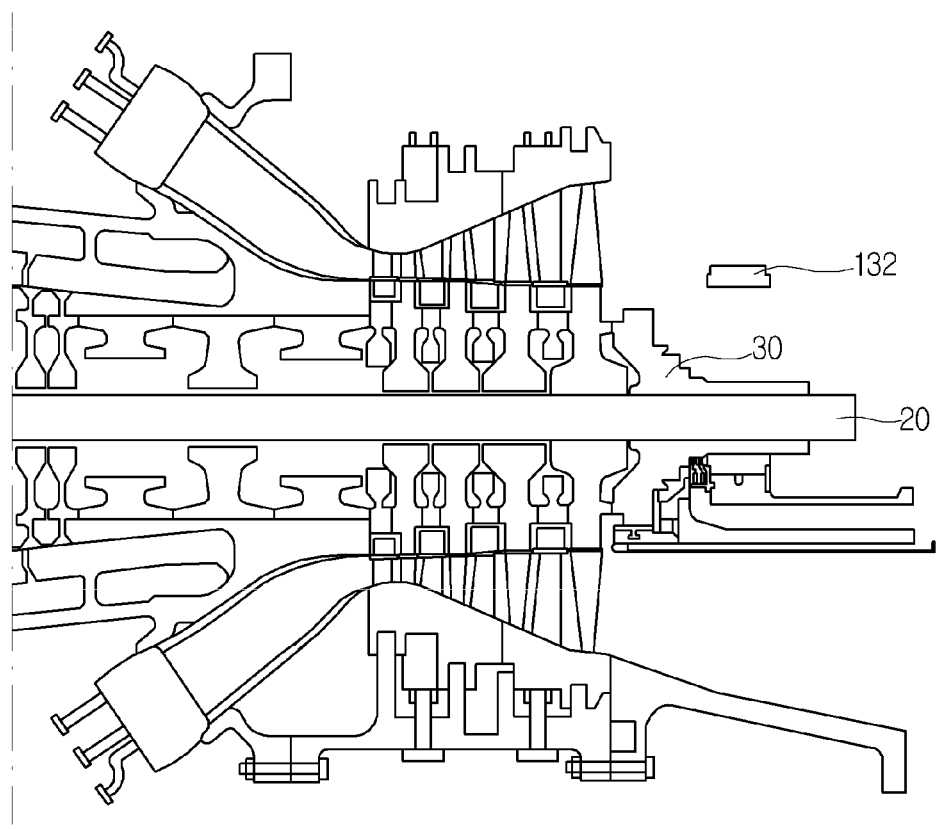

[FIG. 9]
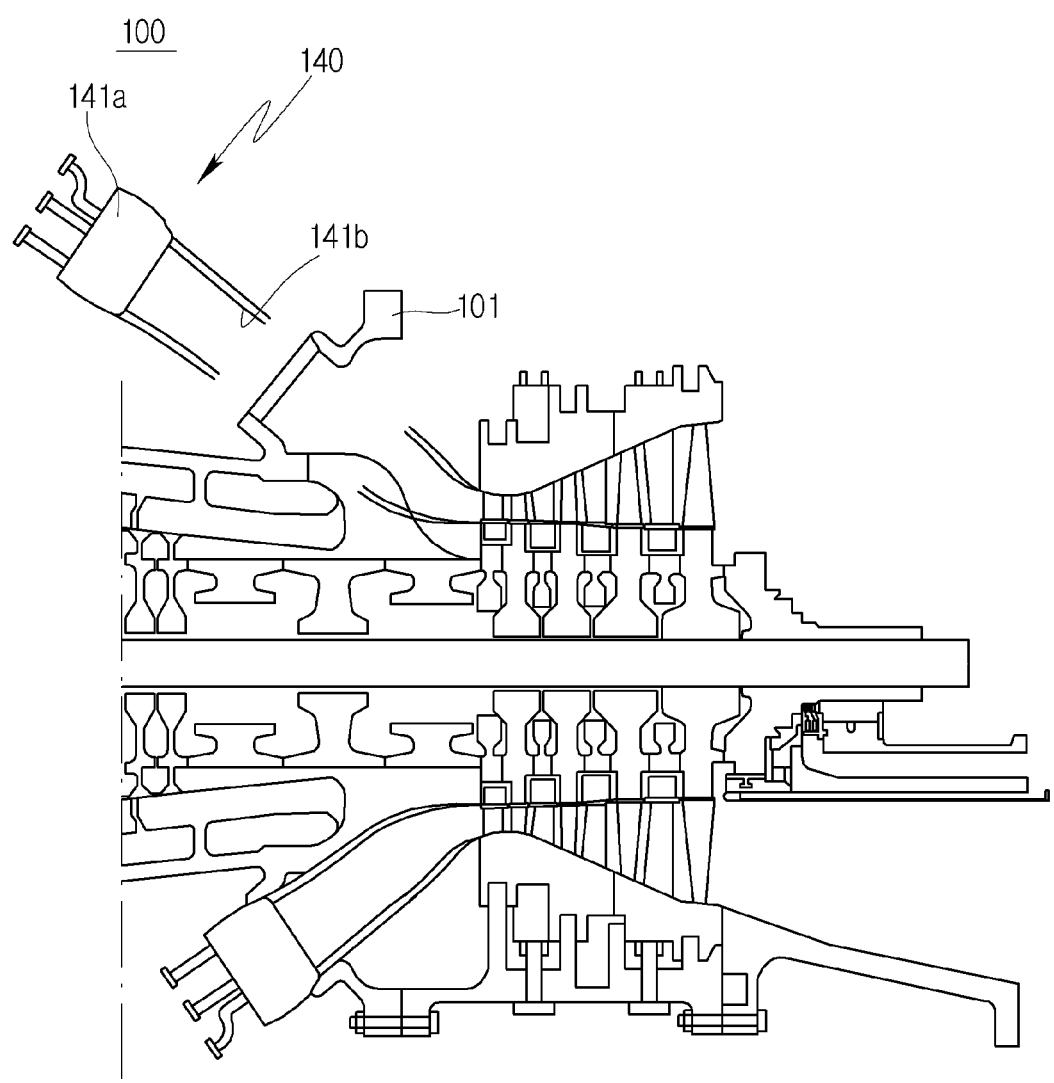

[FIG. 10]
100
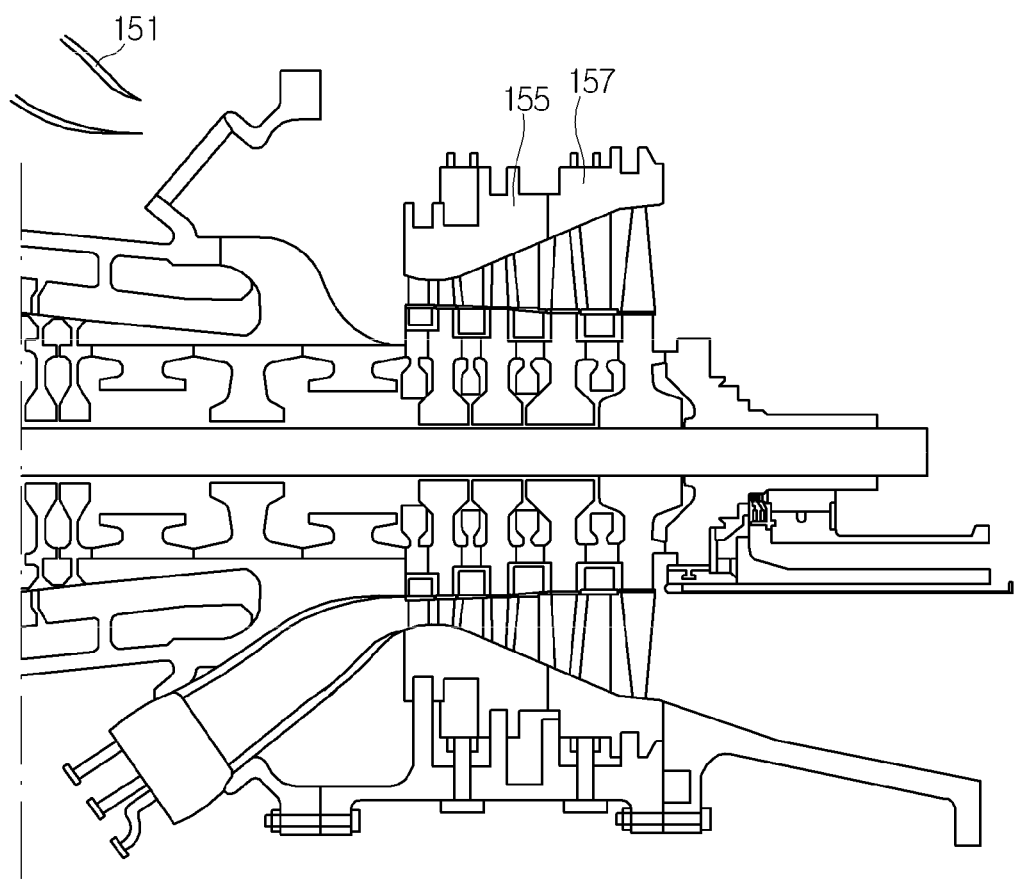

[FIG. 11]
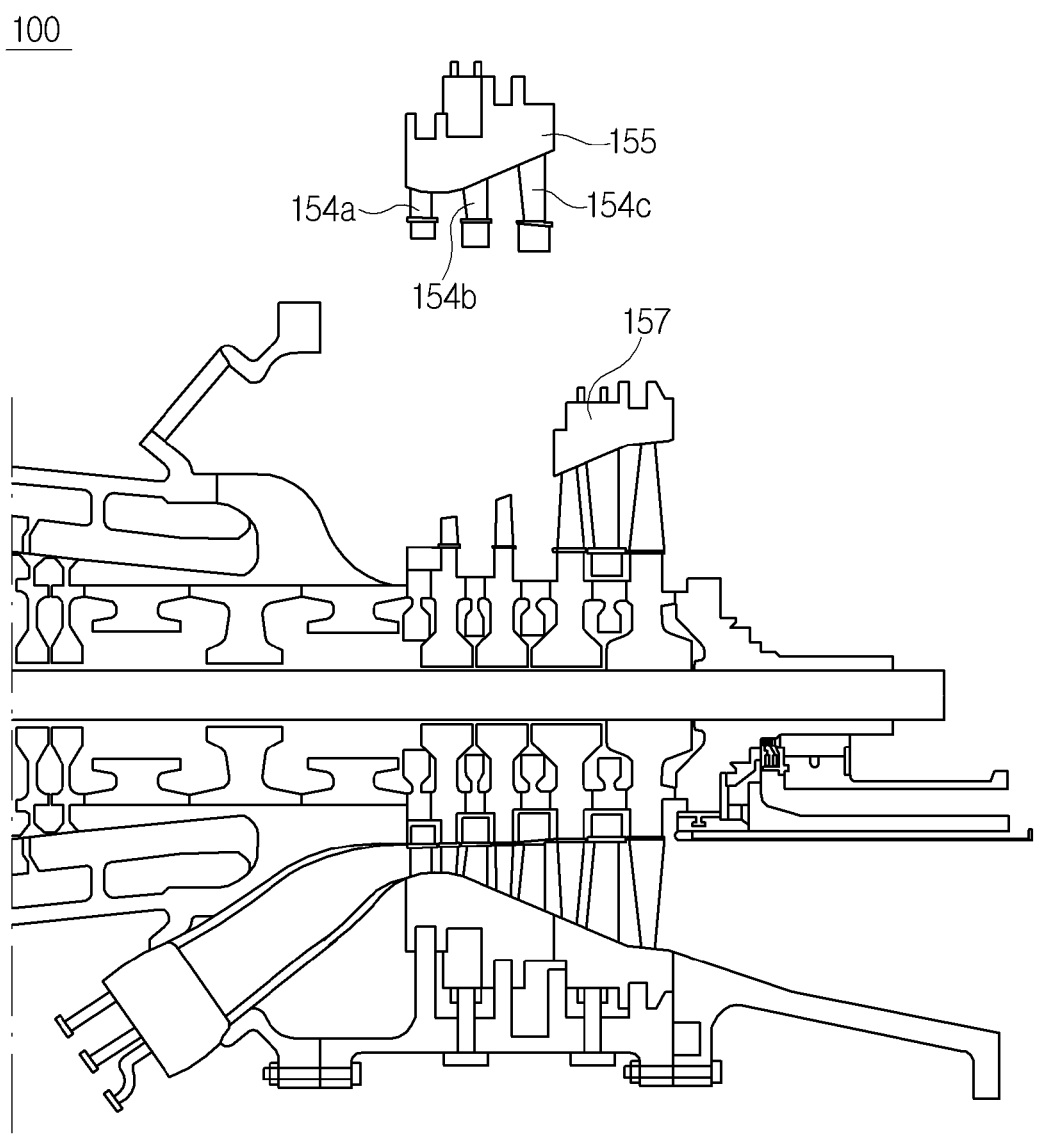

[FIG. 12]
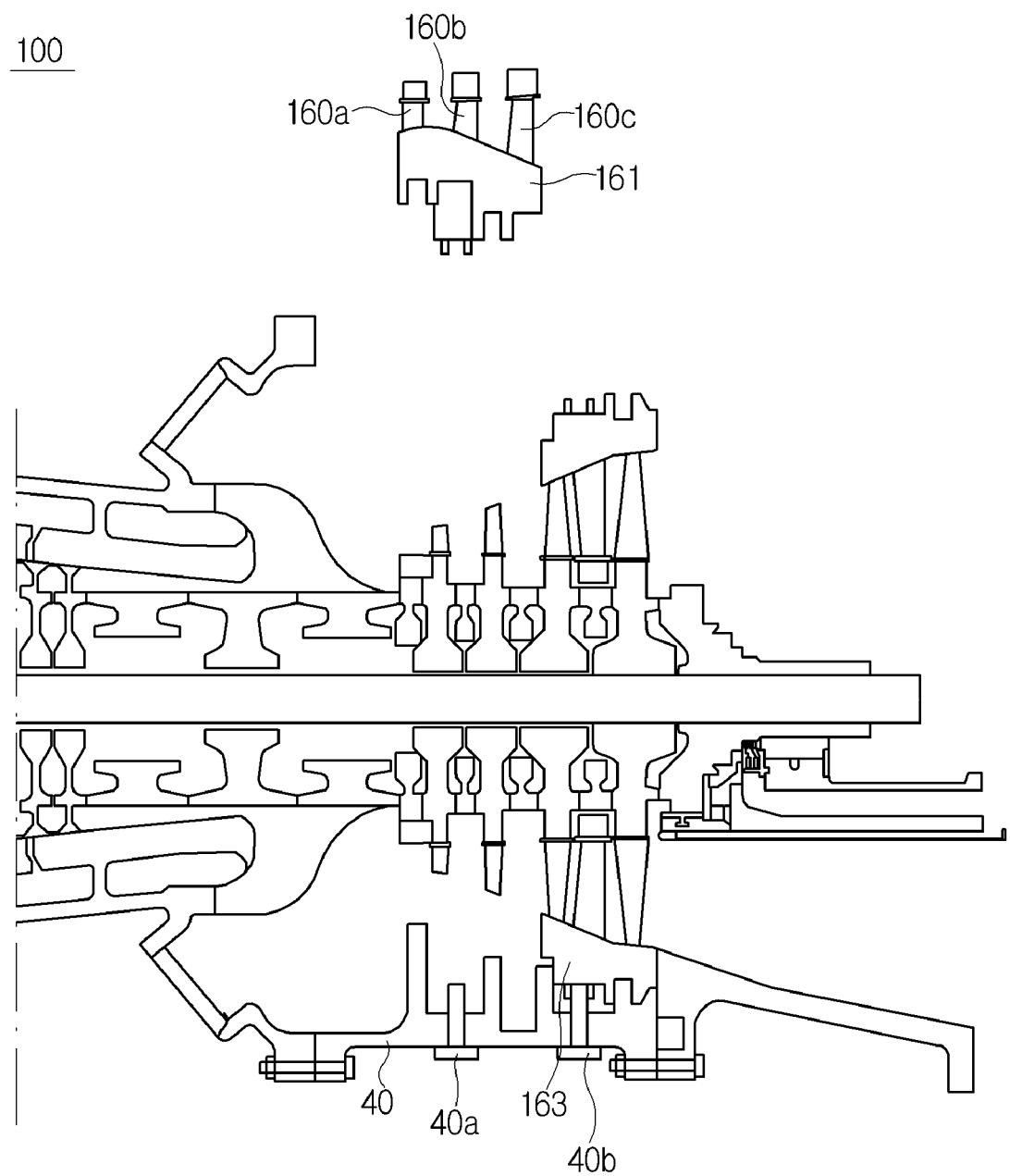

[FIG. 13]
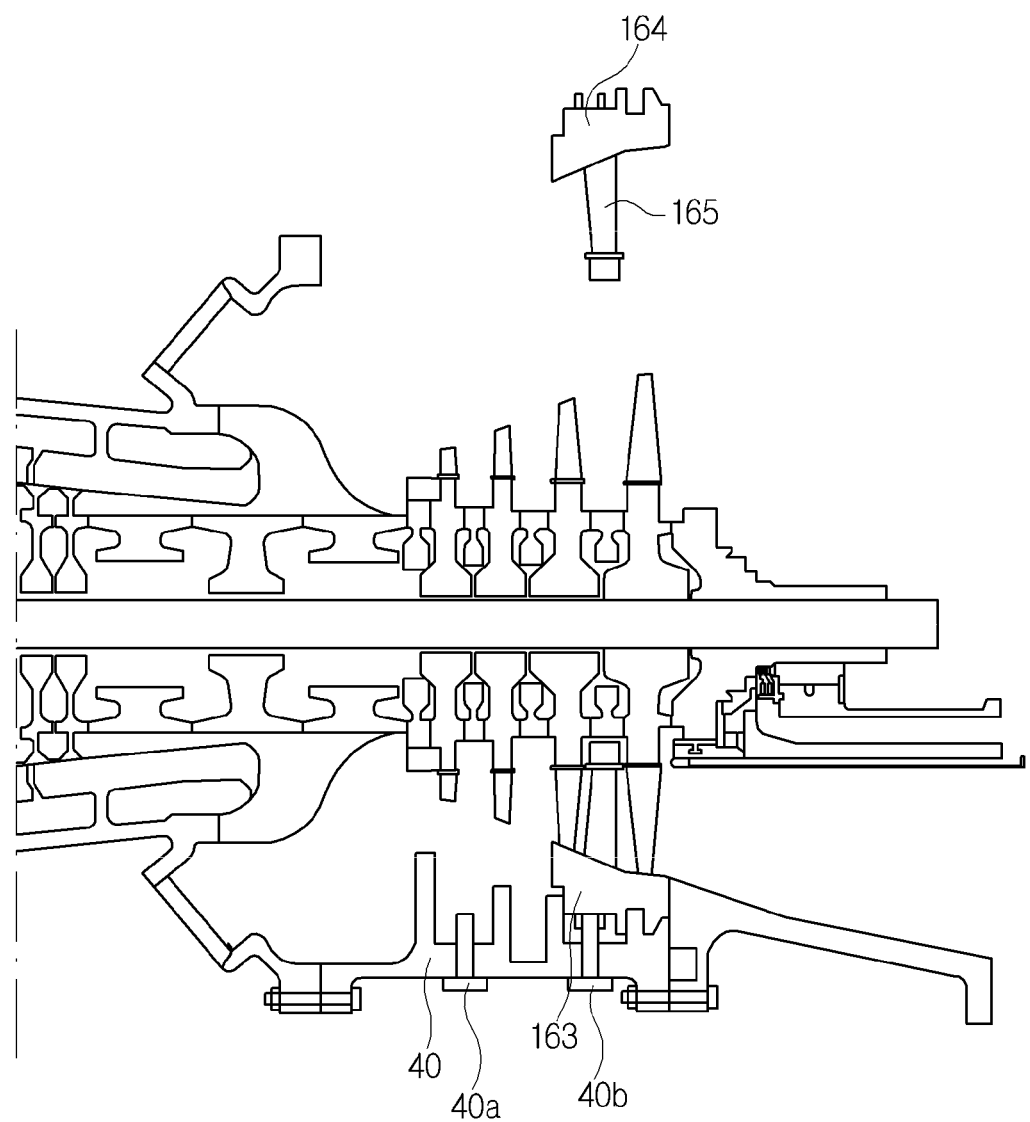

[FIG. 14]
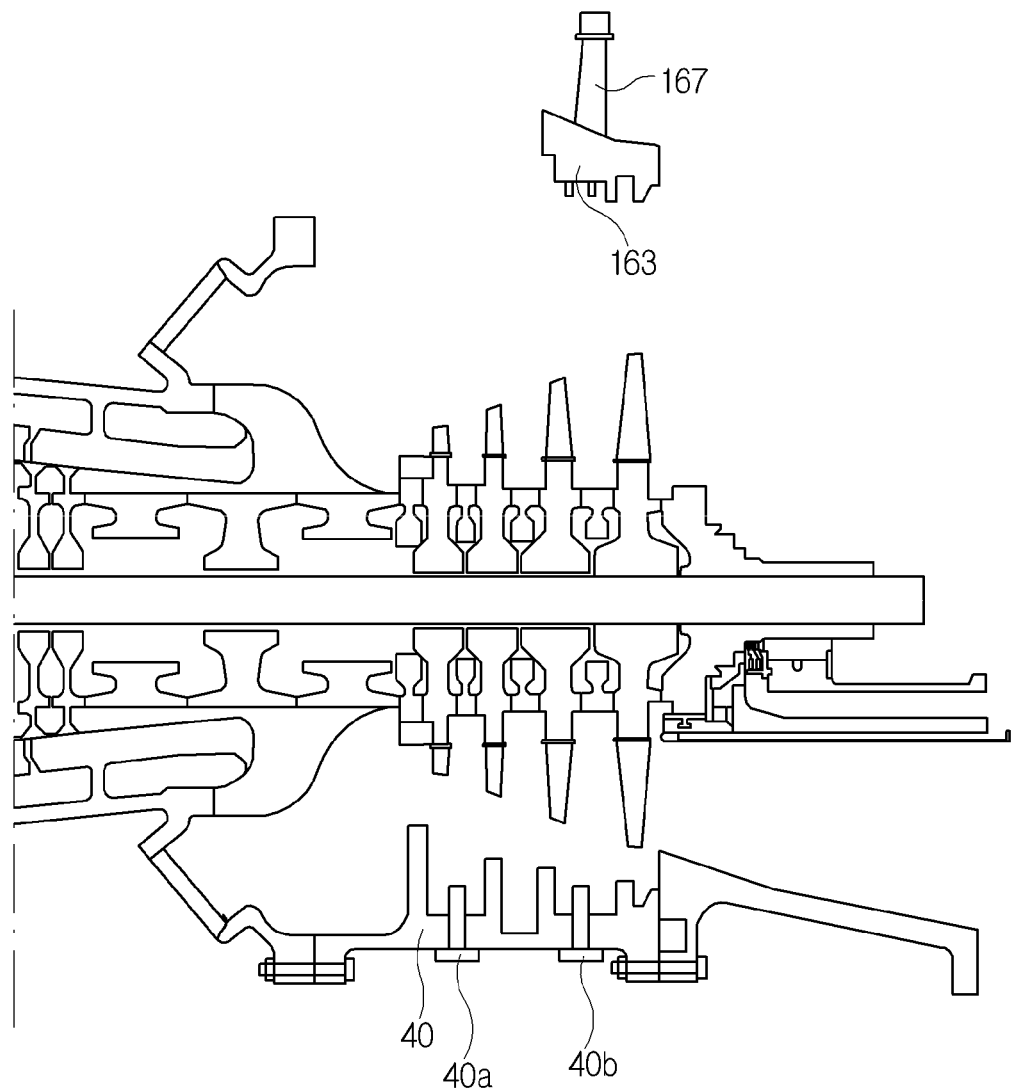

[FIG. 15]
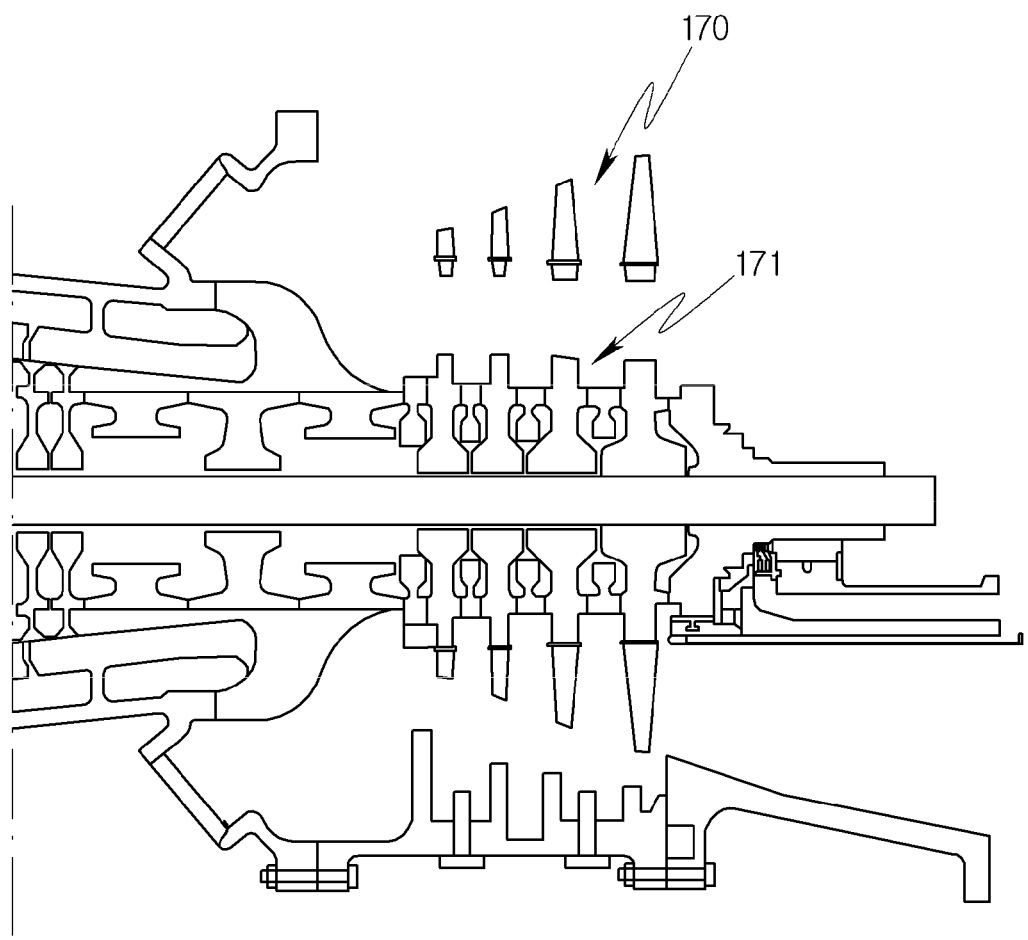

[FIG. 16]
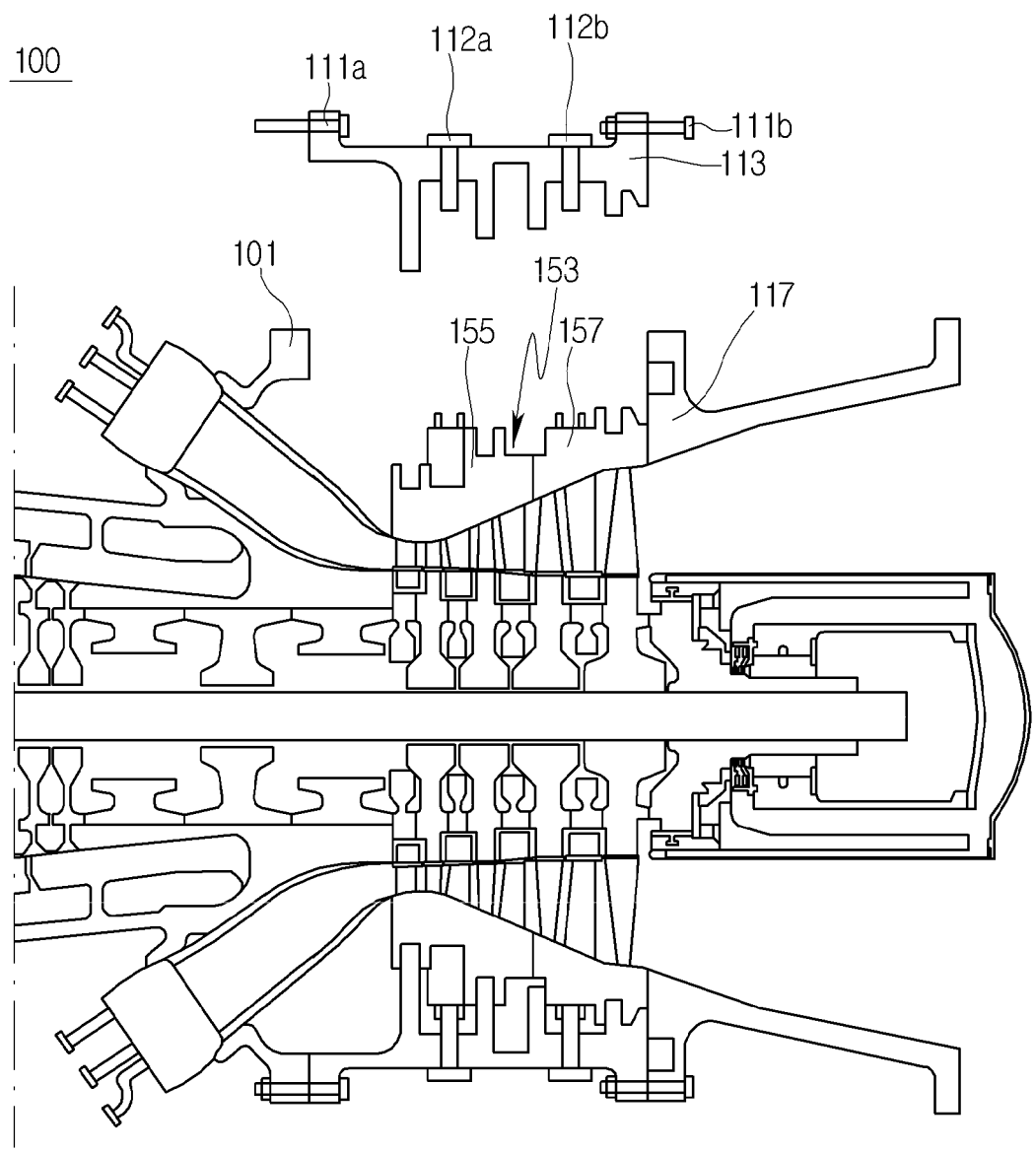

[FIG. 17]
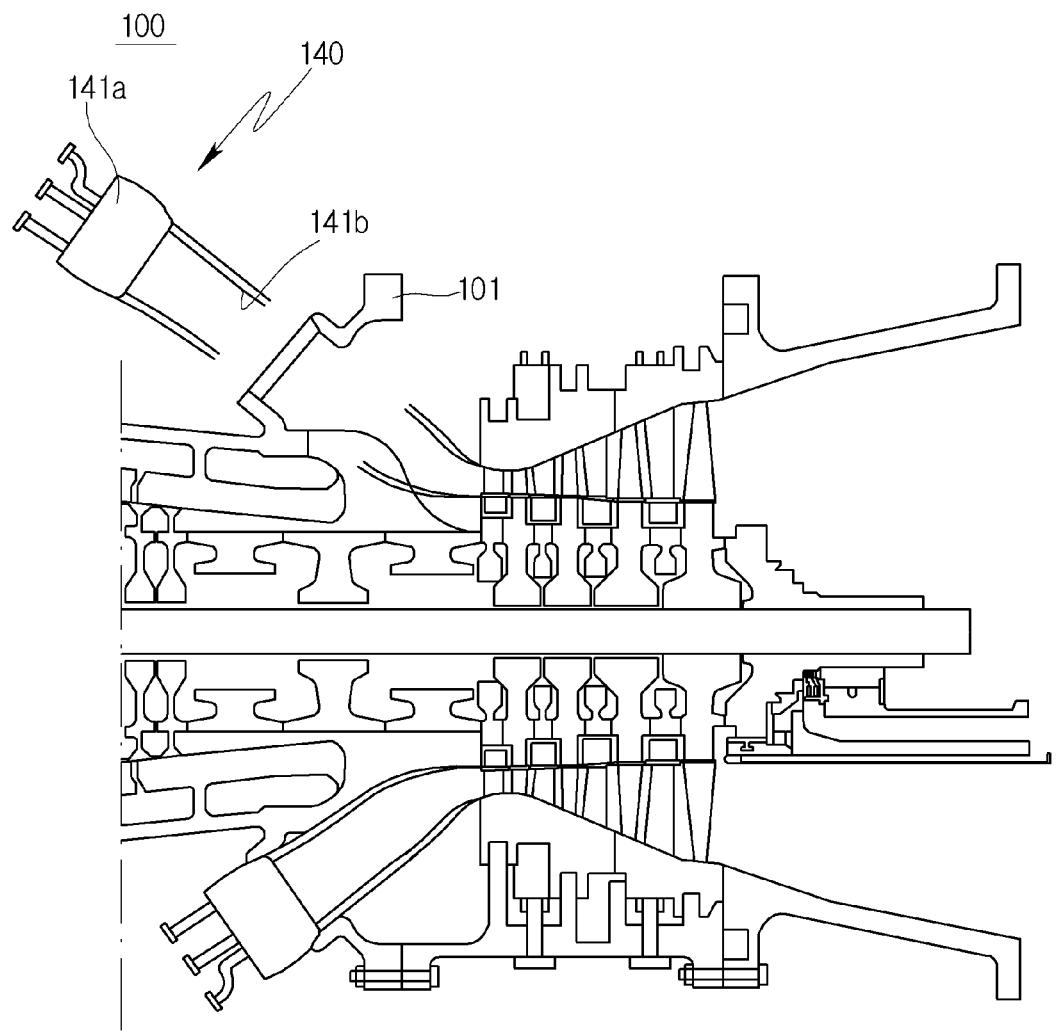

[FIG. 18]
100
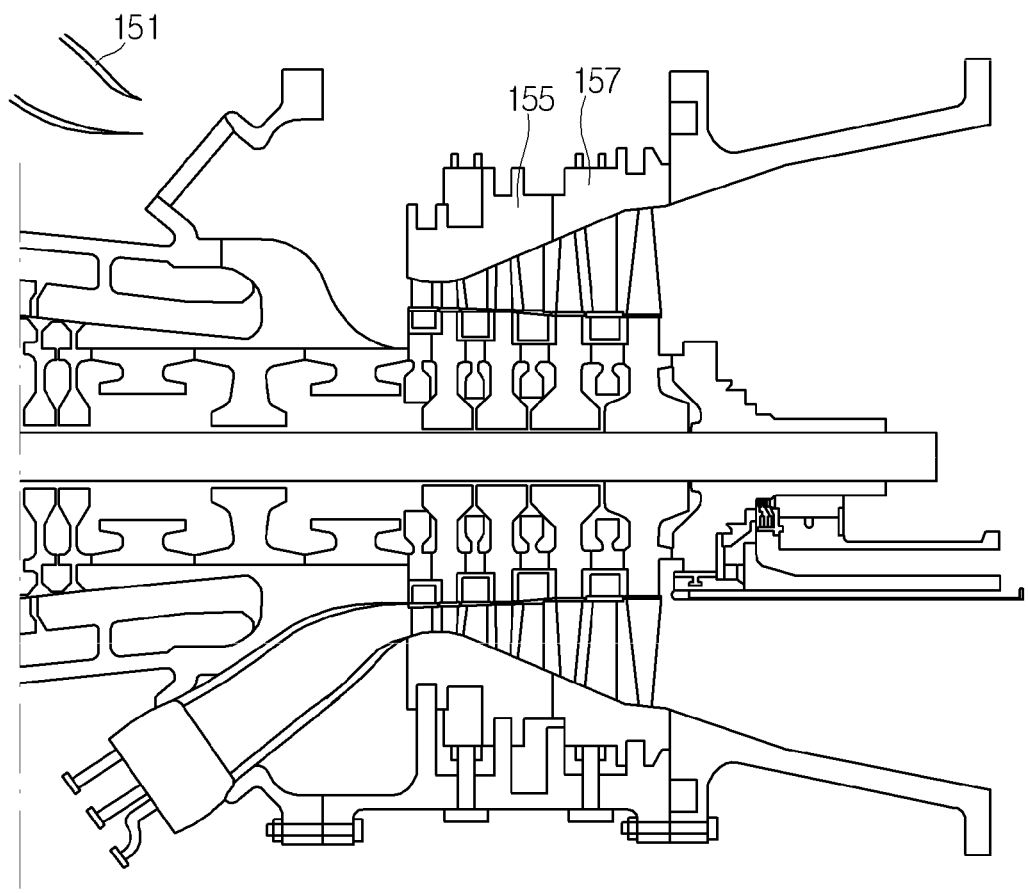

[FIG. 19]
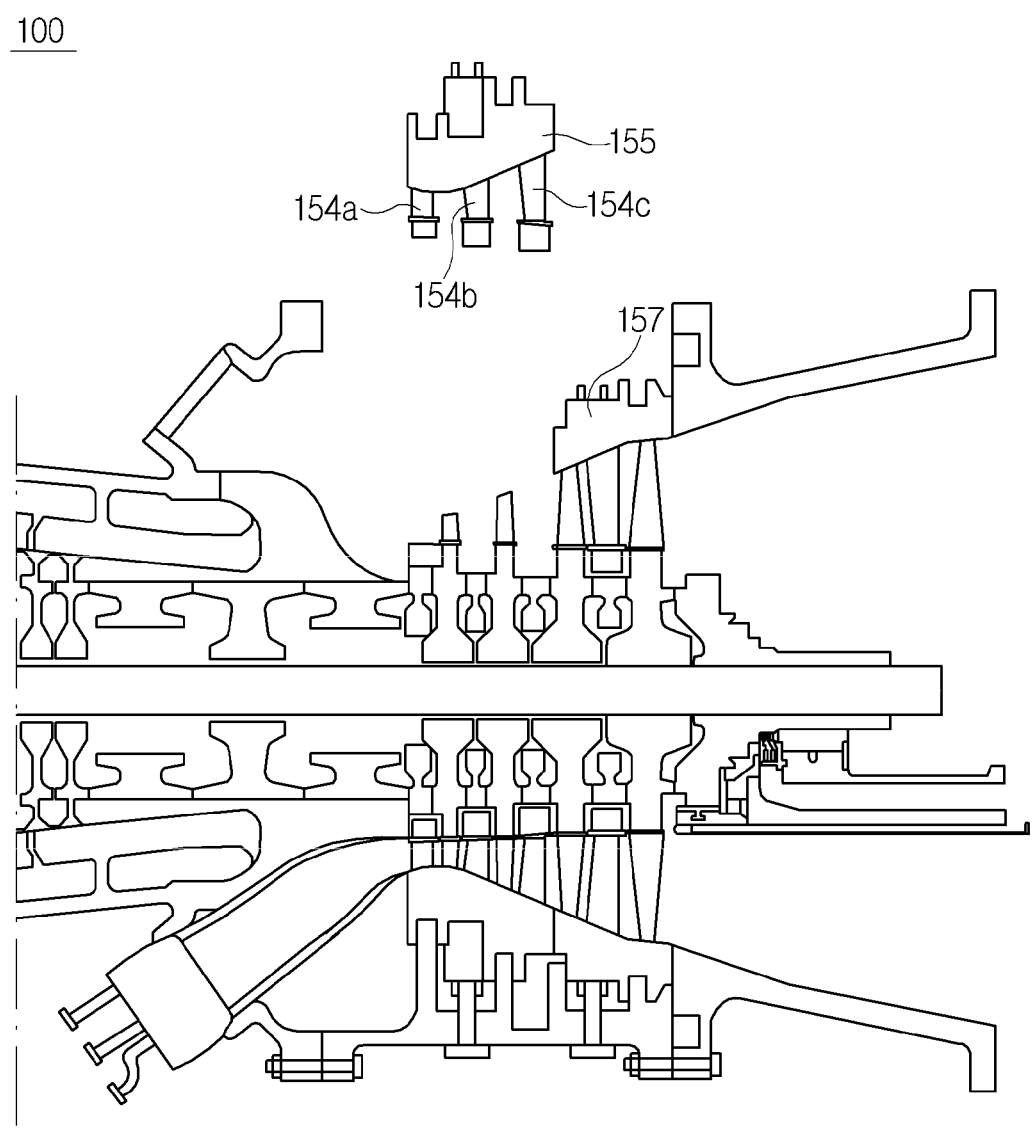

[FIG. 20]
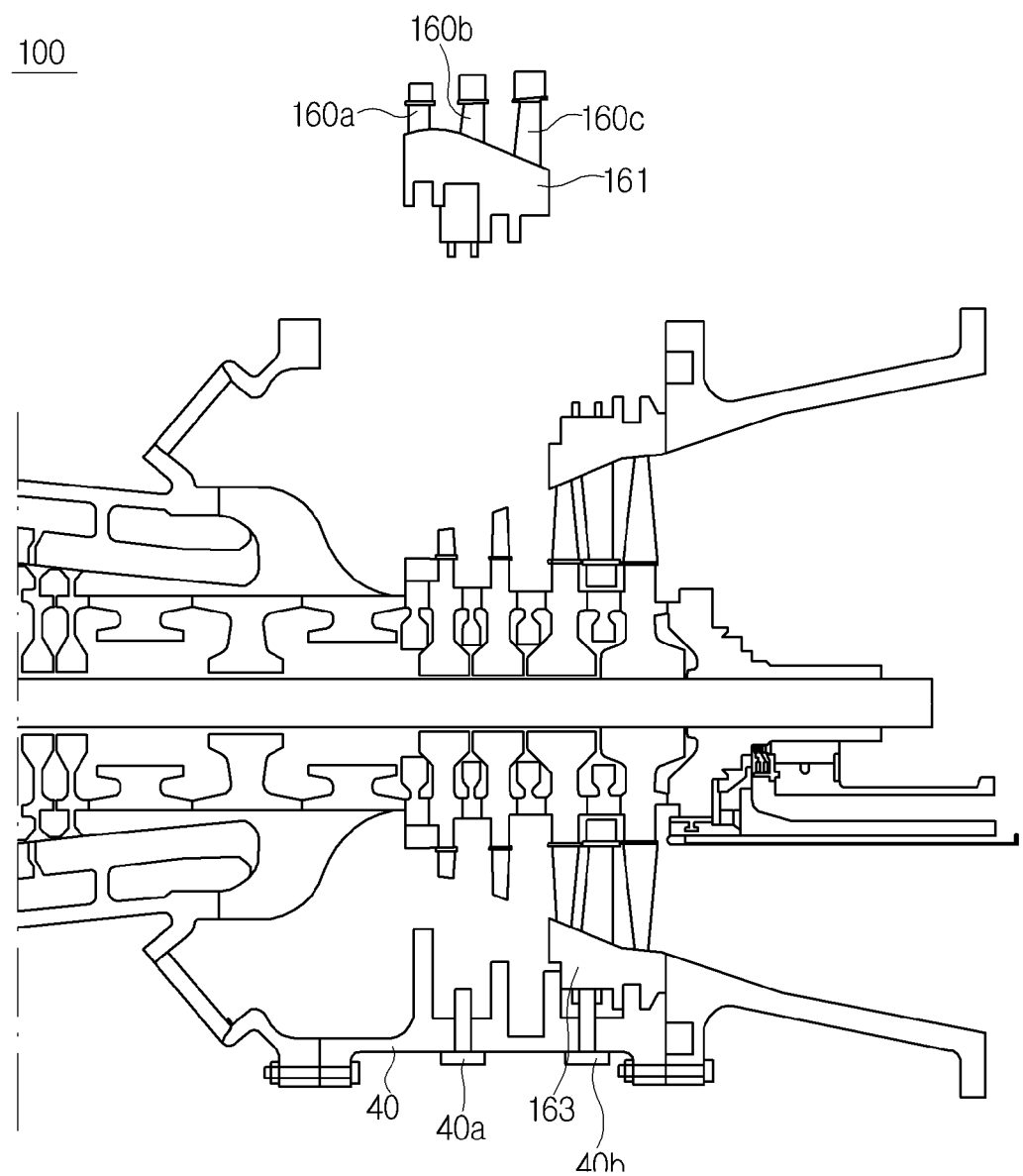

[FIG. 21]
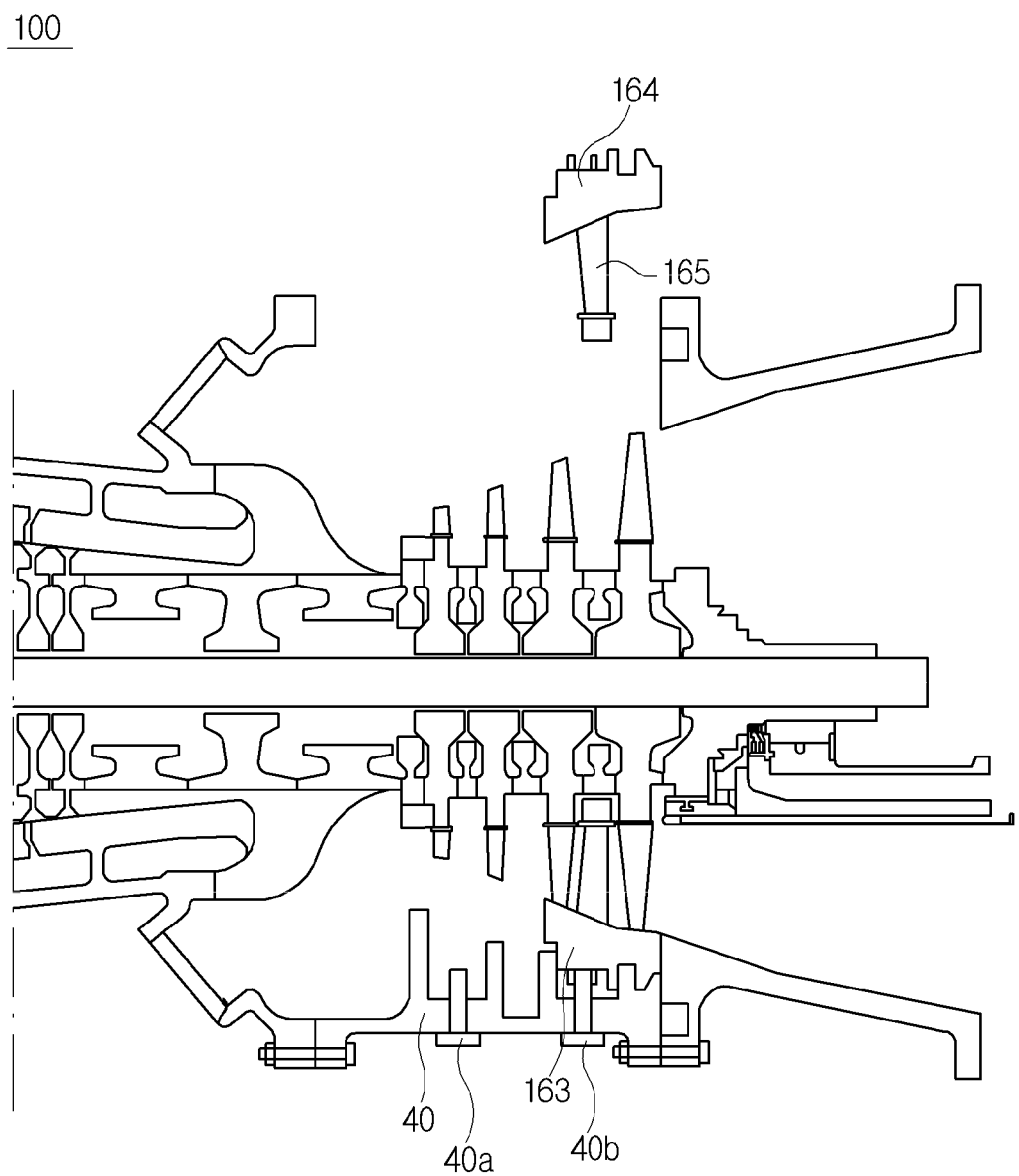

[FIG. 22]
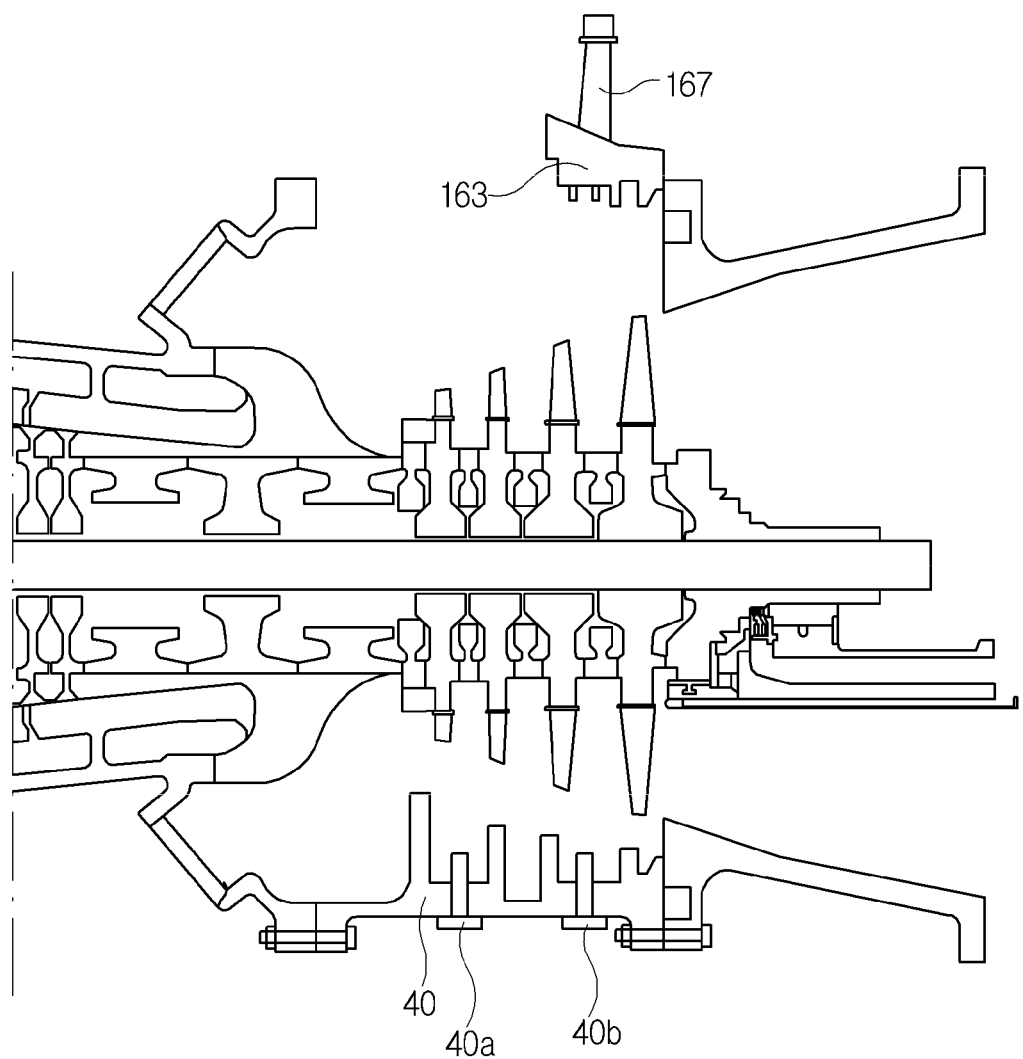

[FIG. 23]
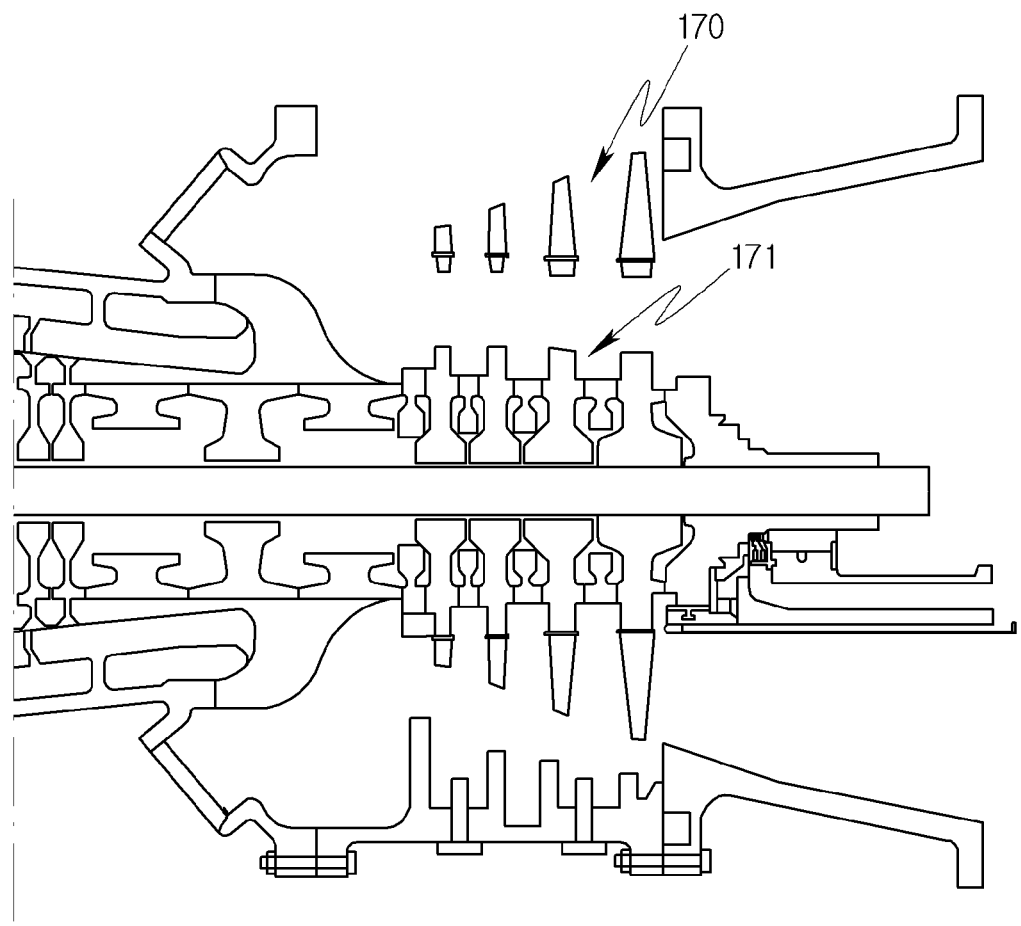

[FIG. 24]
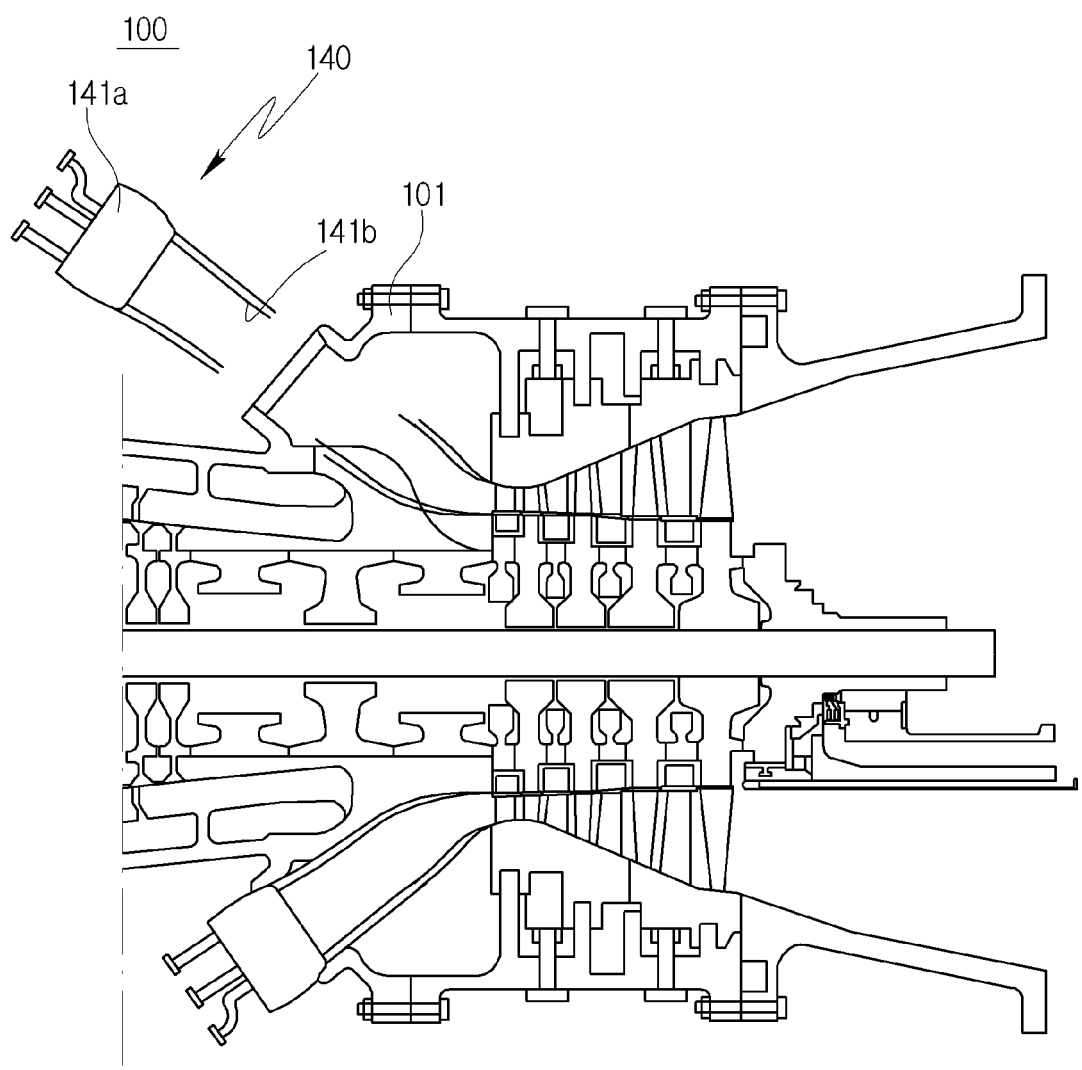

[FIG. 25]
100
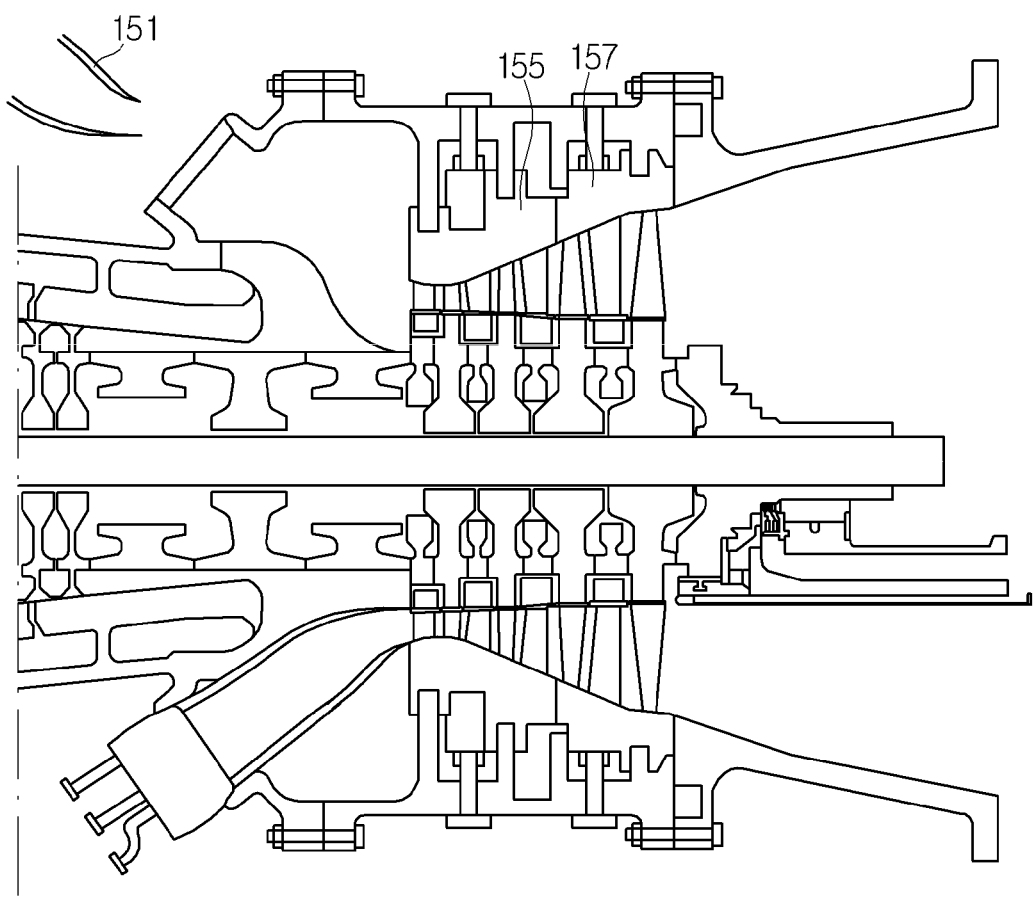

[FIG. 26]
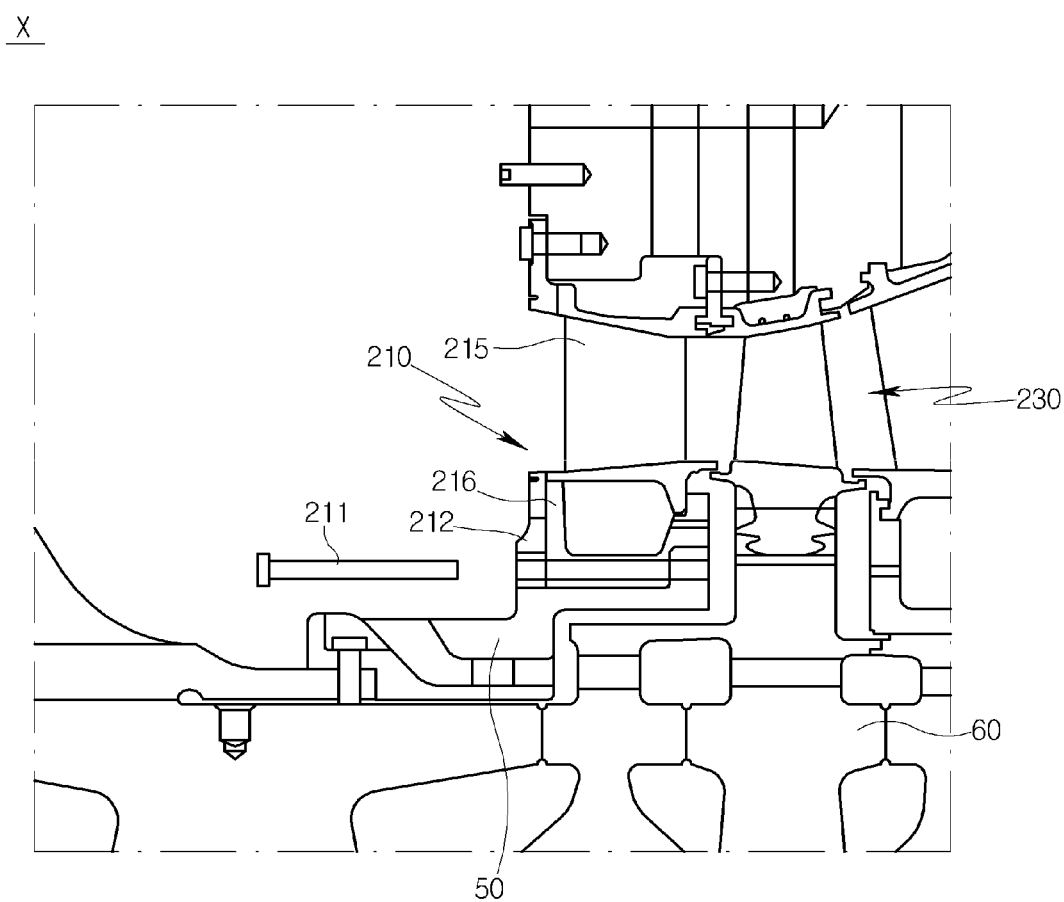

[FIG. 27]
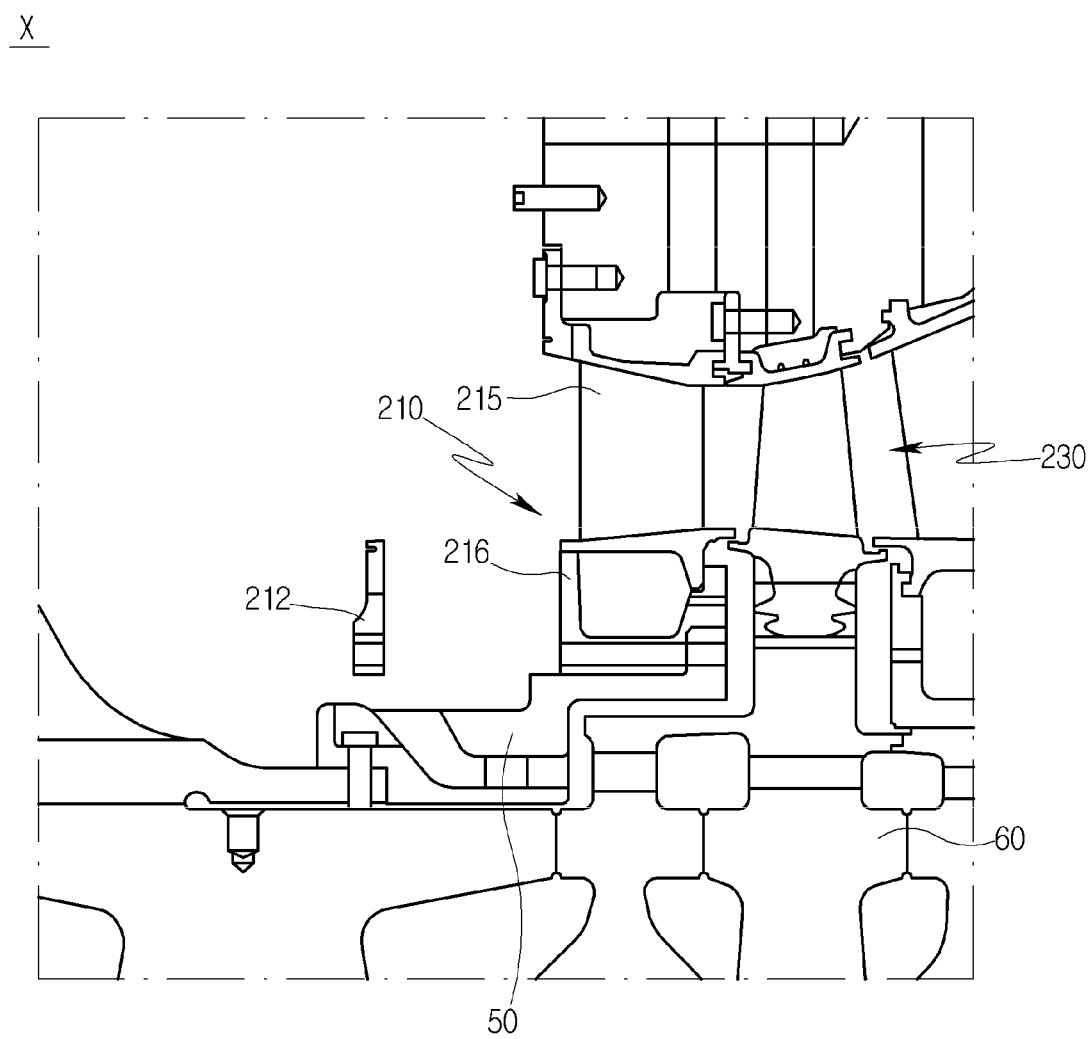

[FIG. 28]
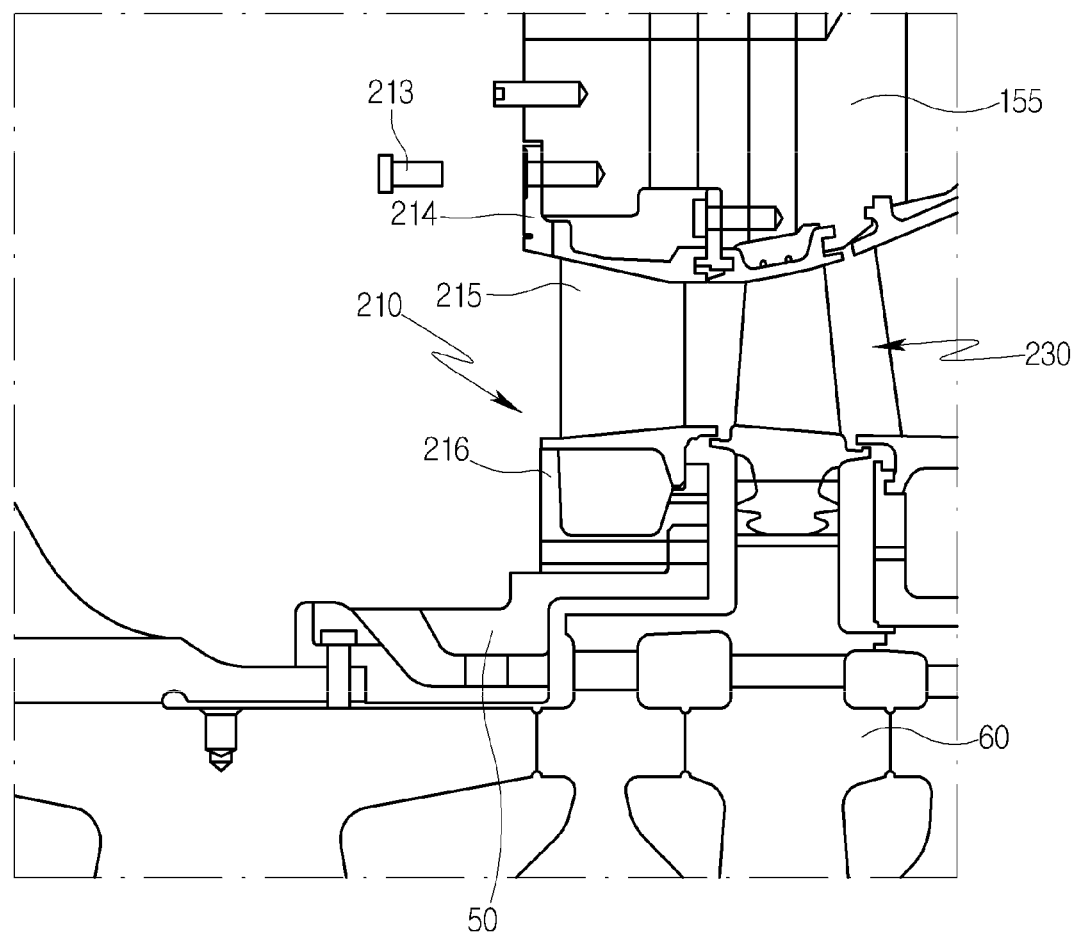

[FIG. 29]
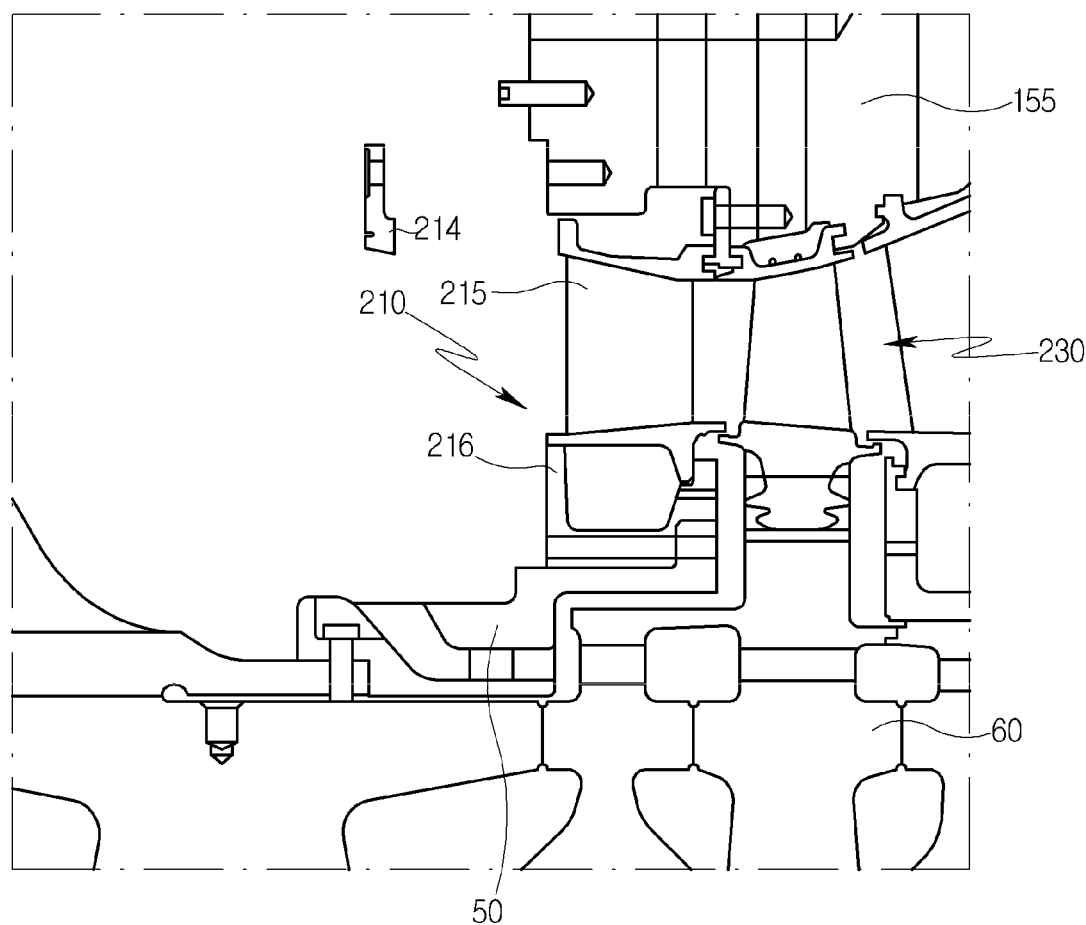

[FIG. 30]
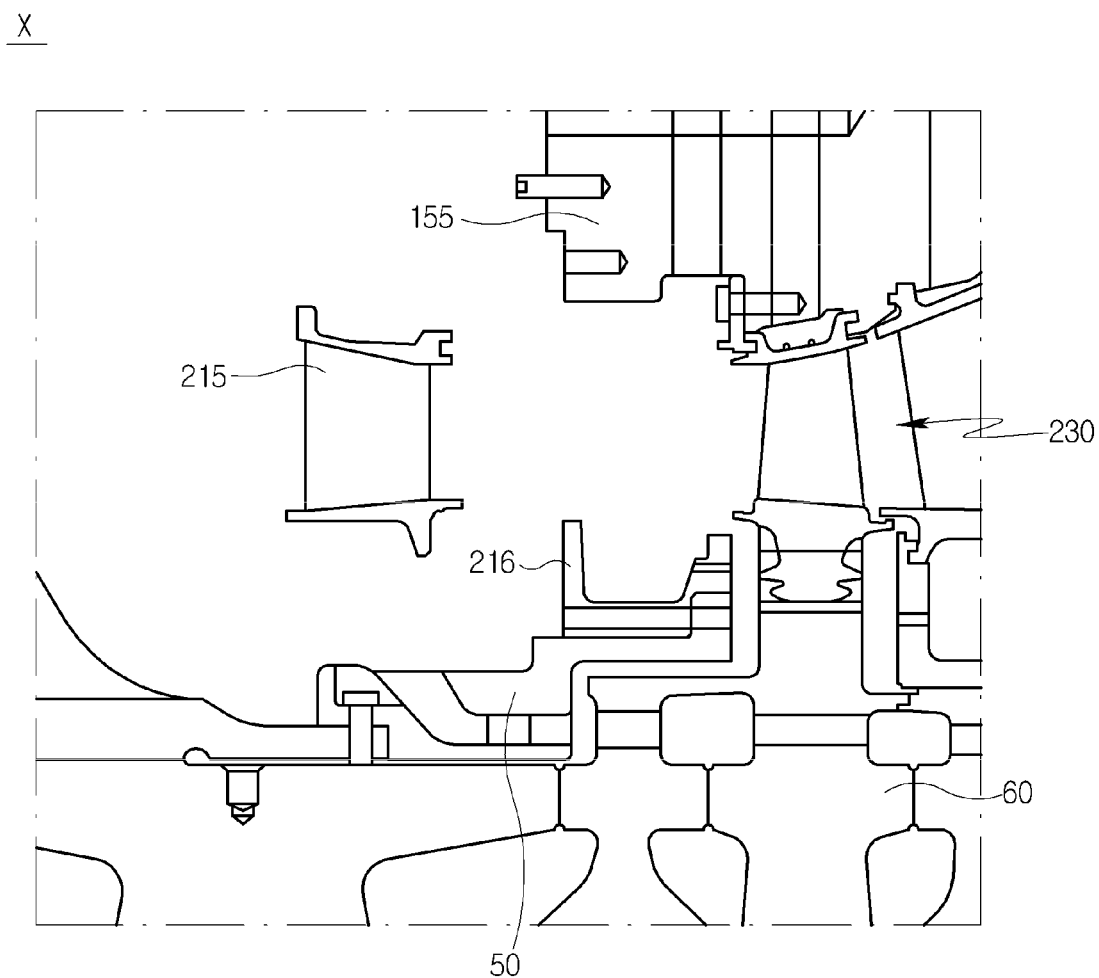

[FIG. 31]
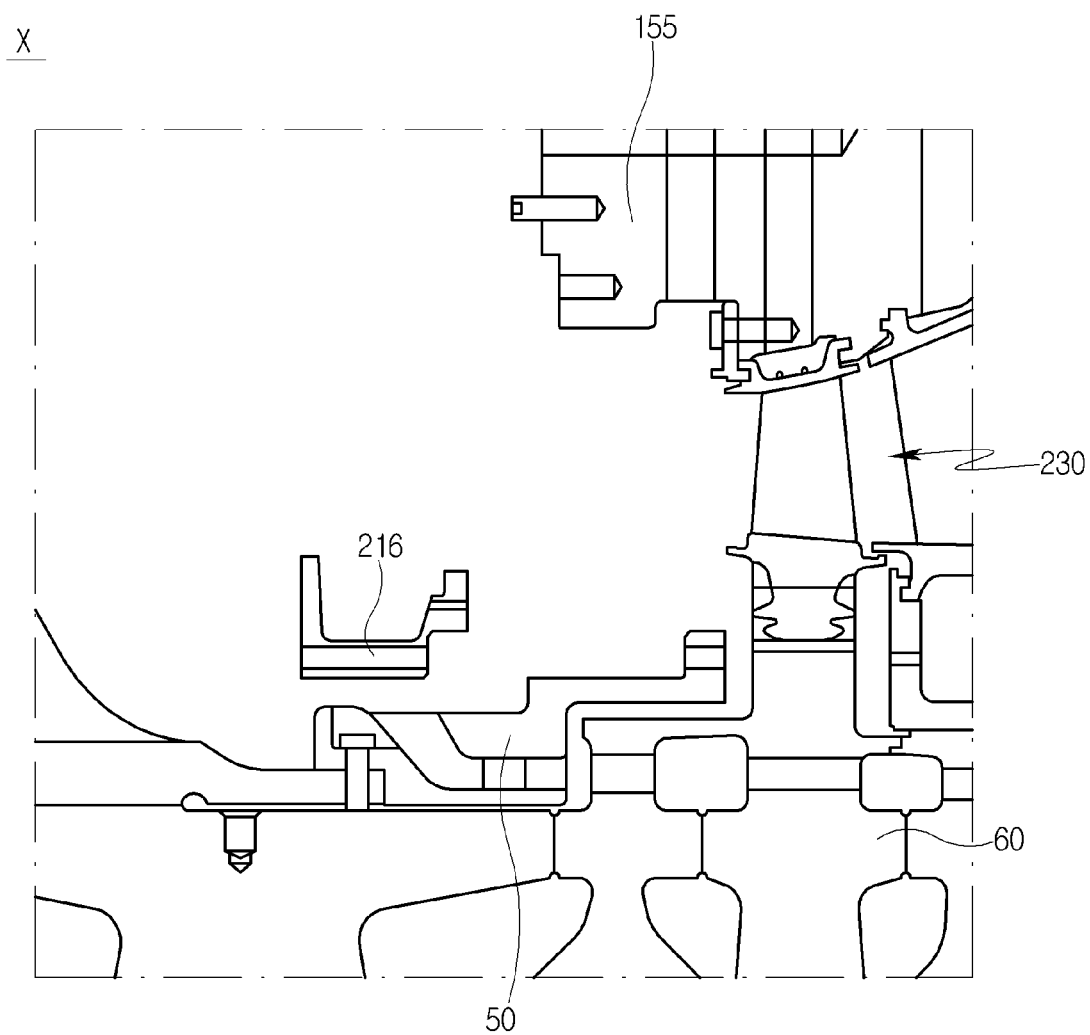

[FIG. 32]
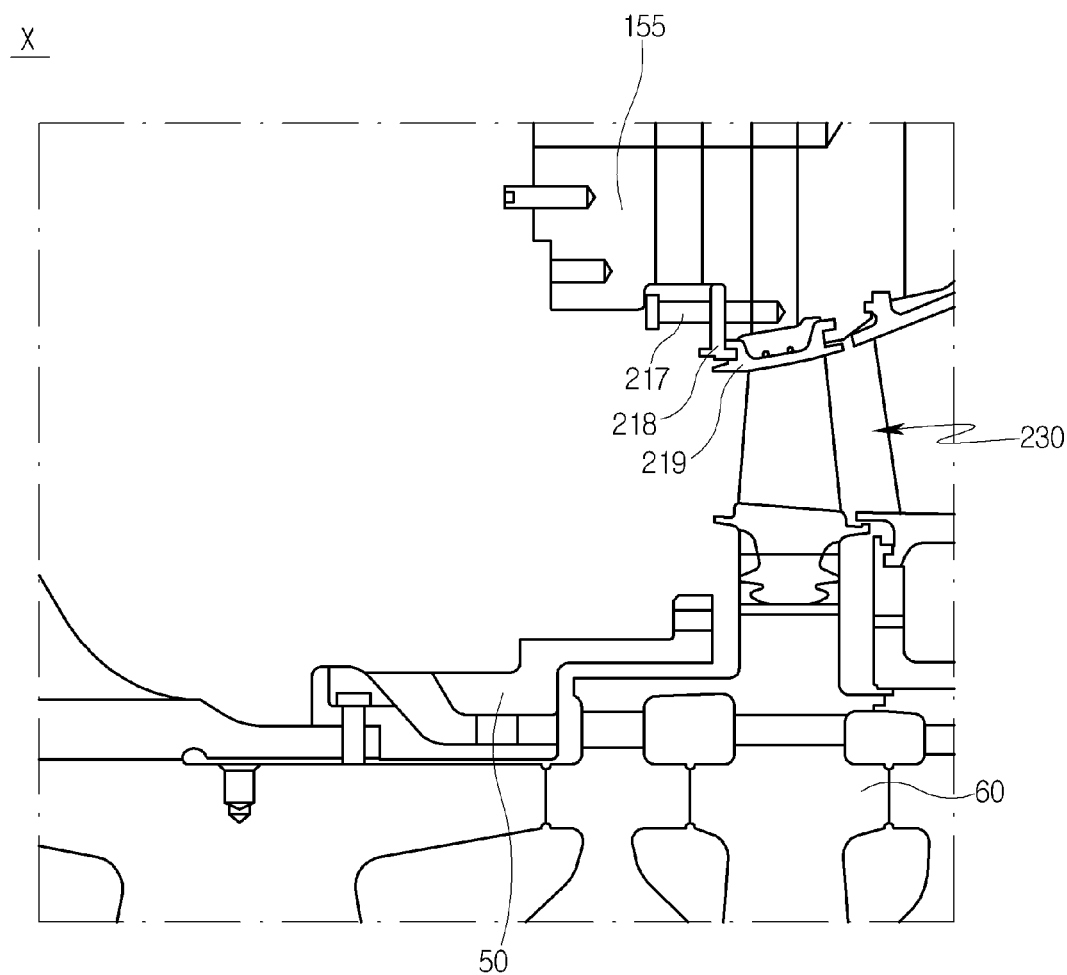

[FIG. 33]
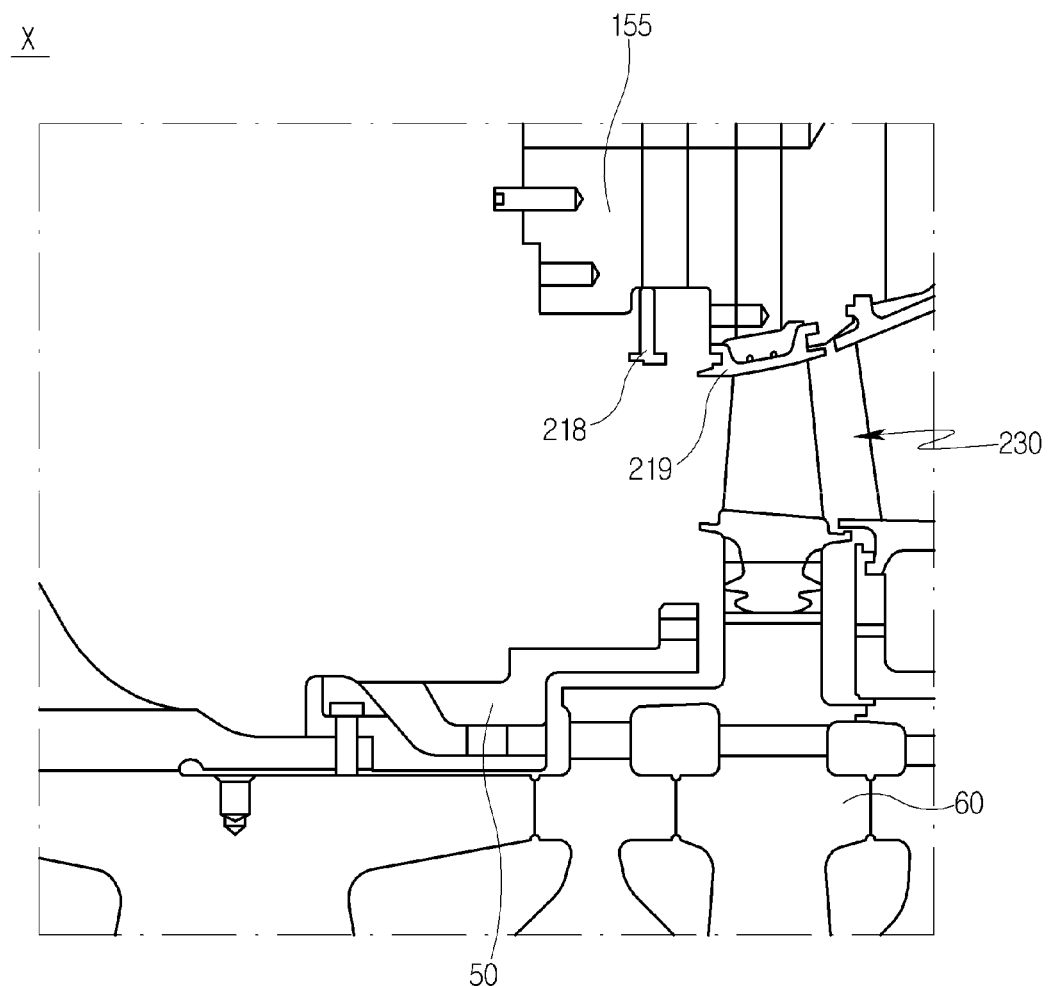

[FIG. 34]
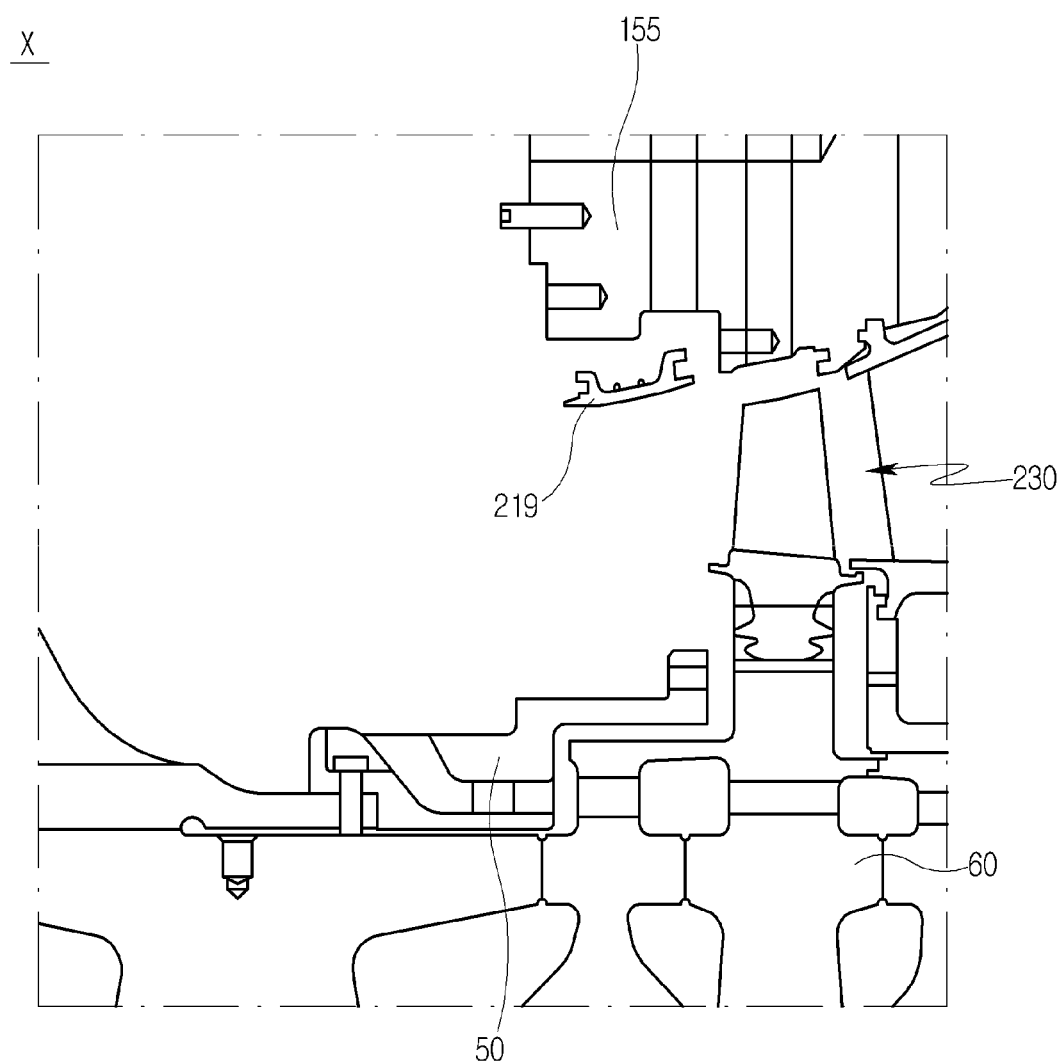

[FIG. 35]
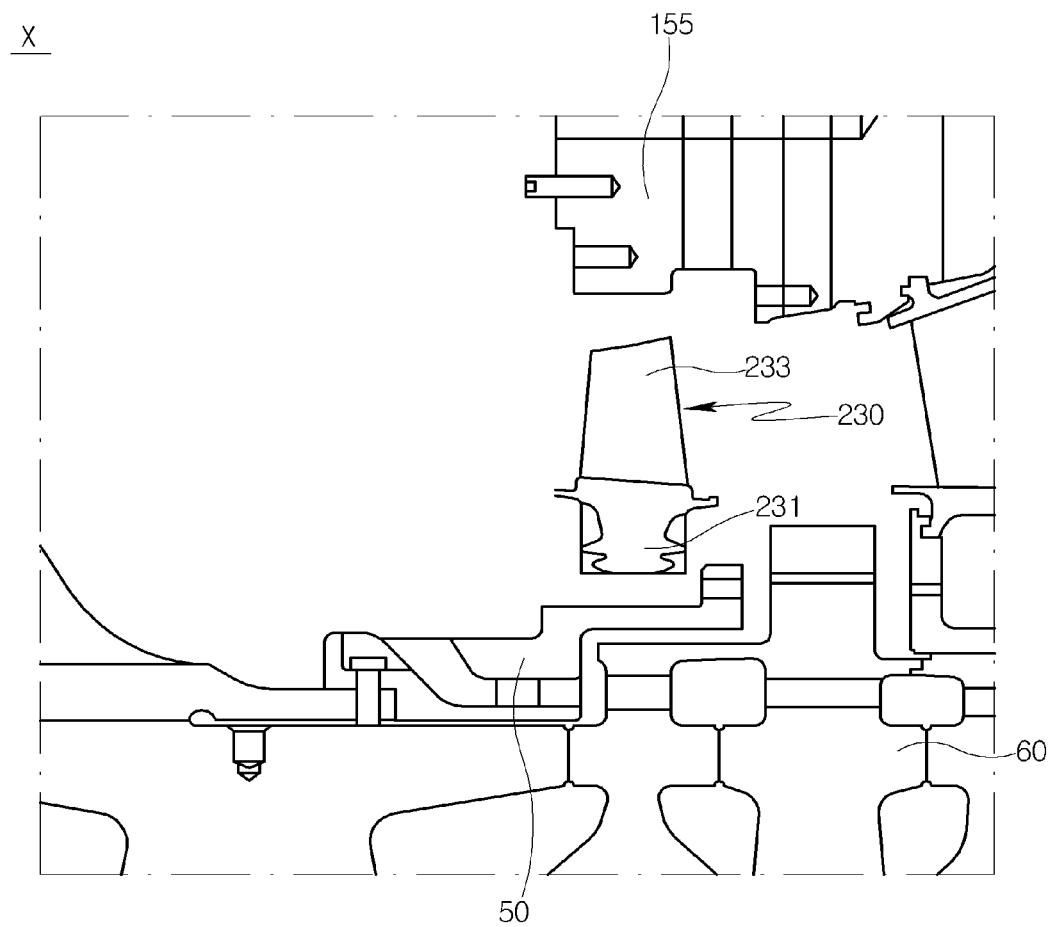

[FIG. 36]
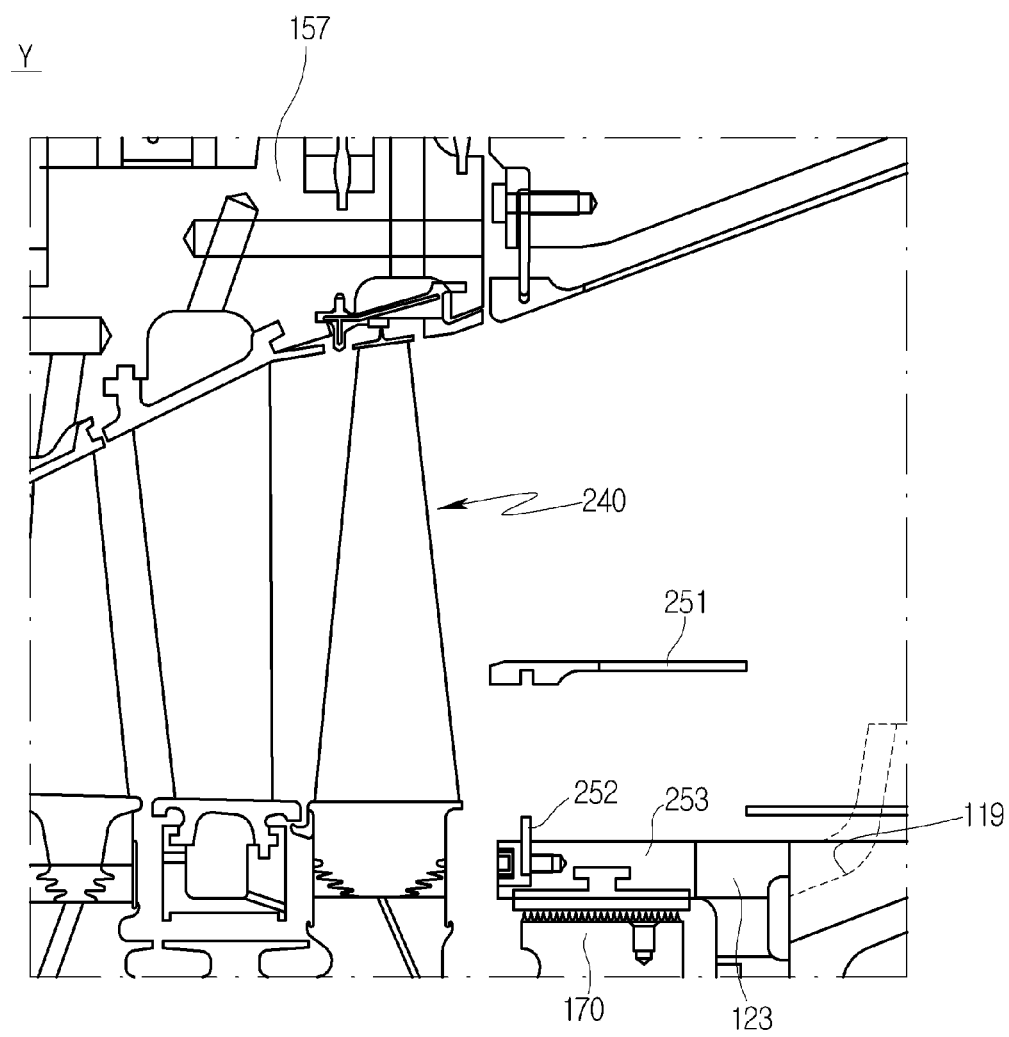

[FIG. 37]
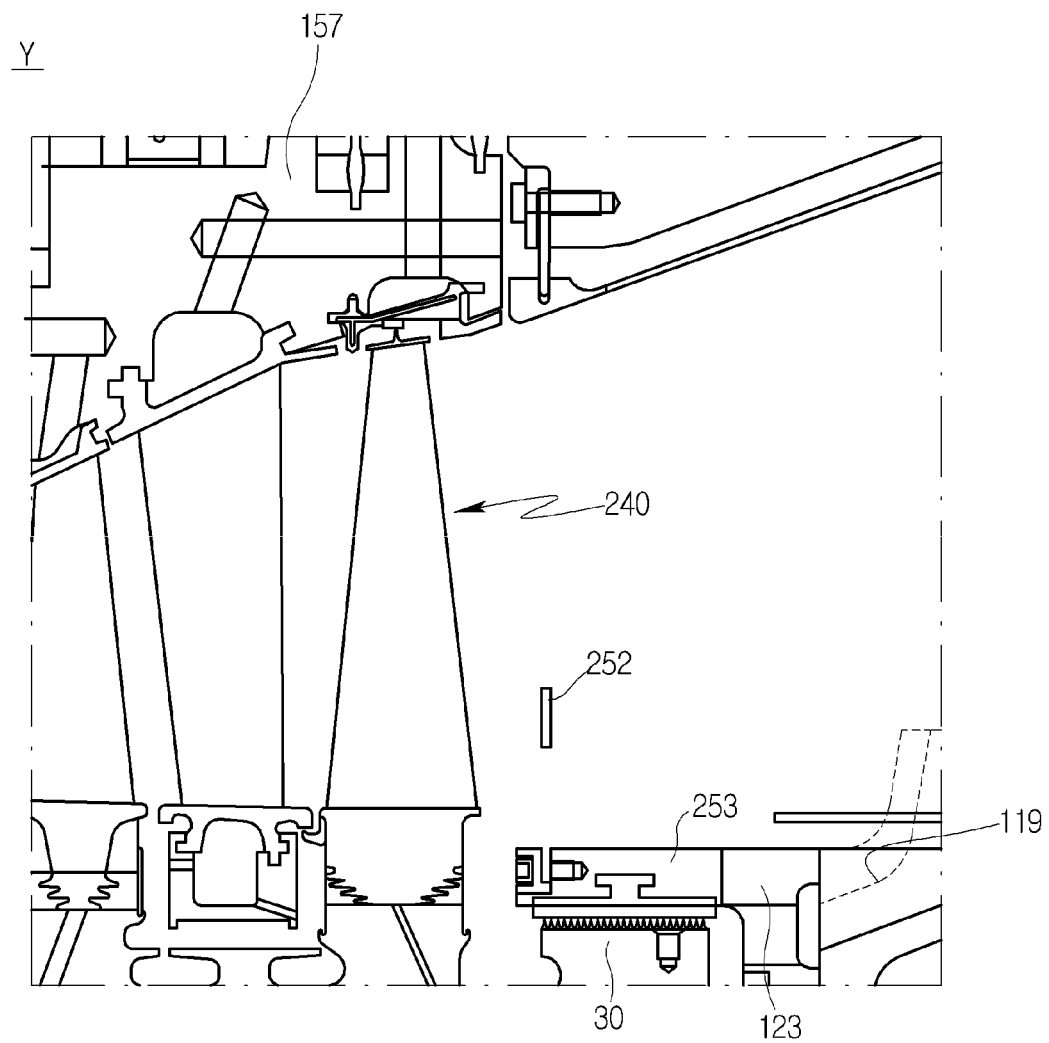

[FIG. 38]
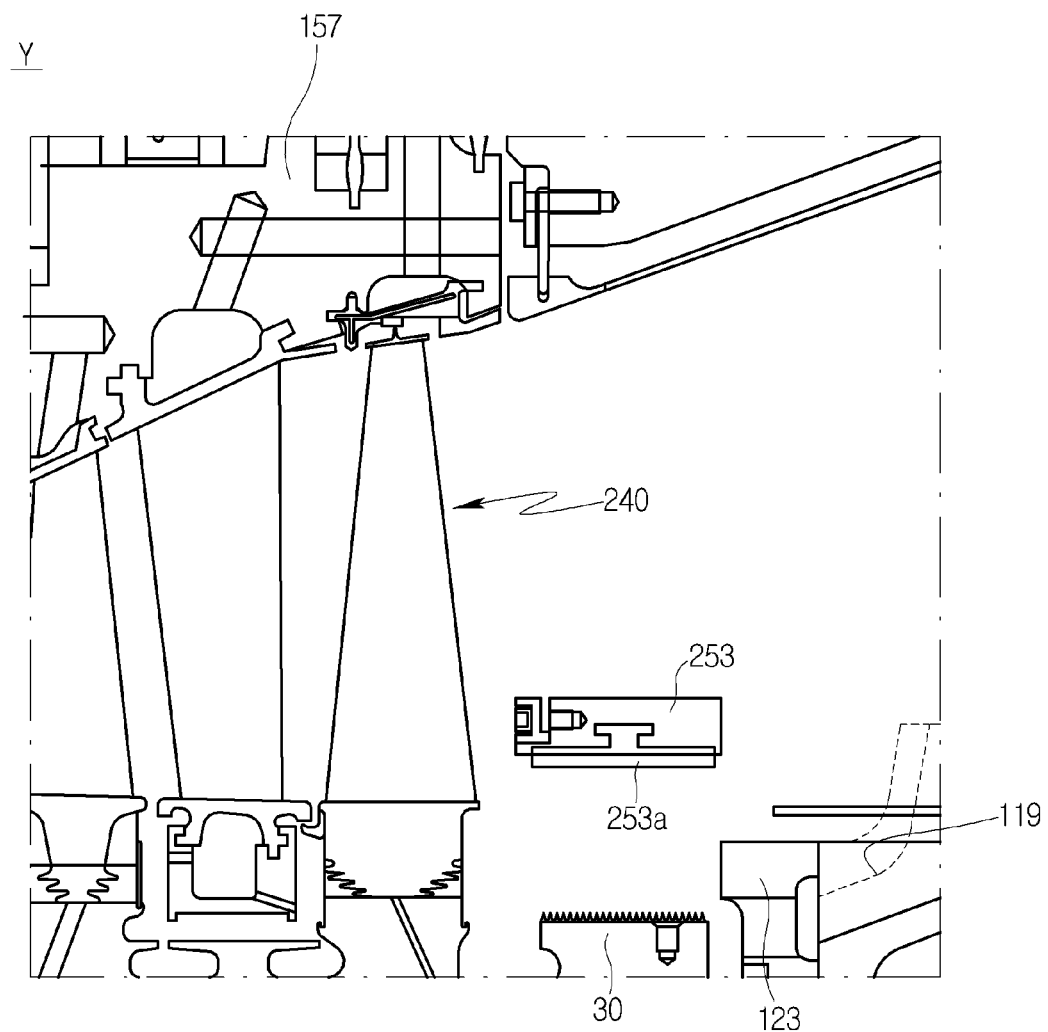

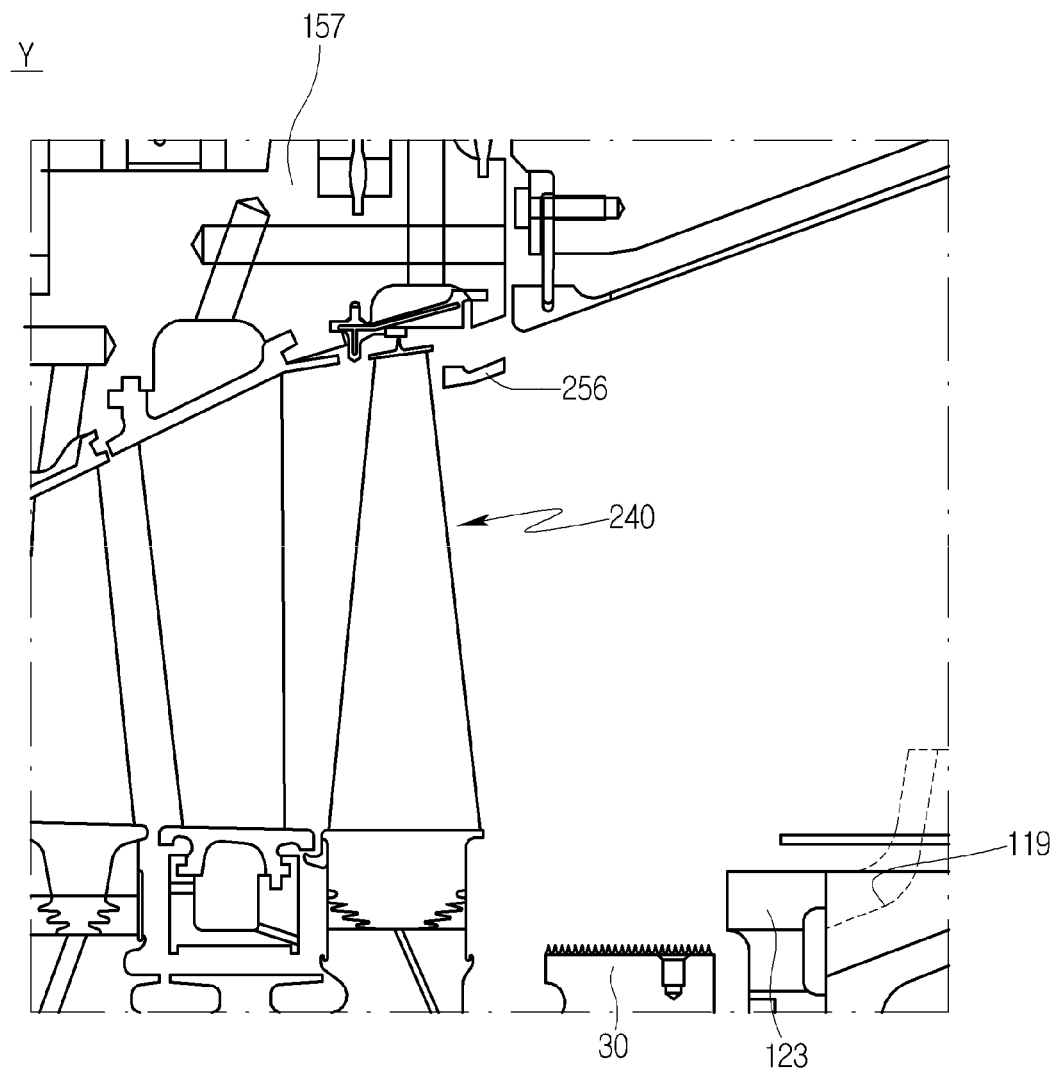
[FIG. 39]

[FIG. 40]
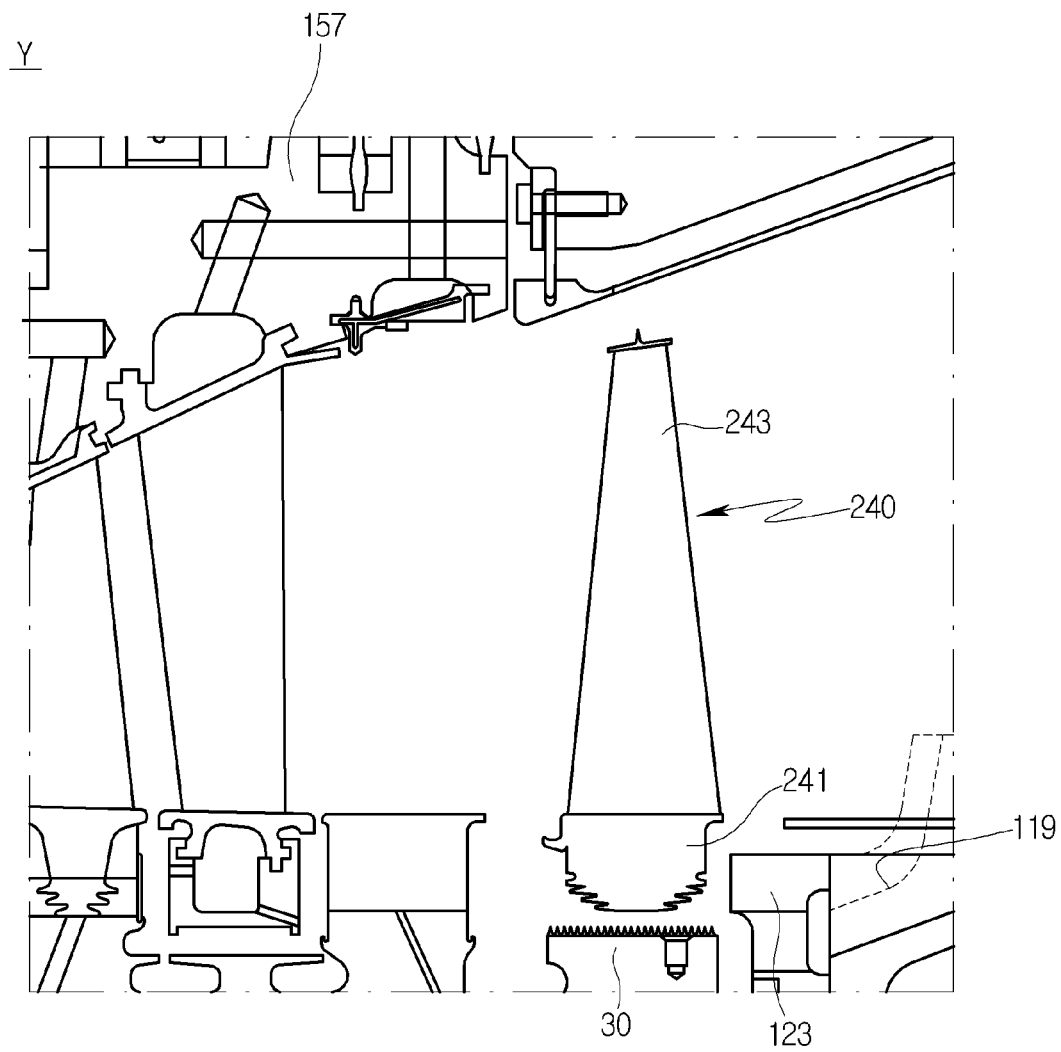

[FIG. 41]
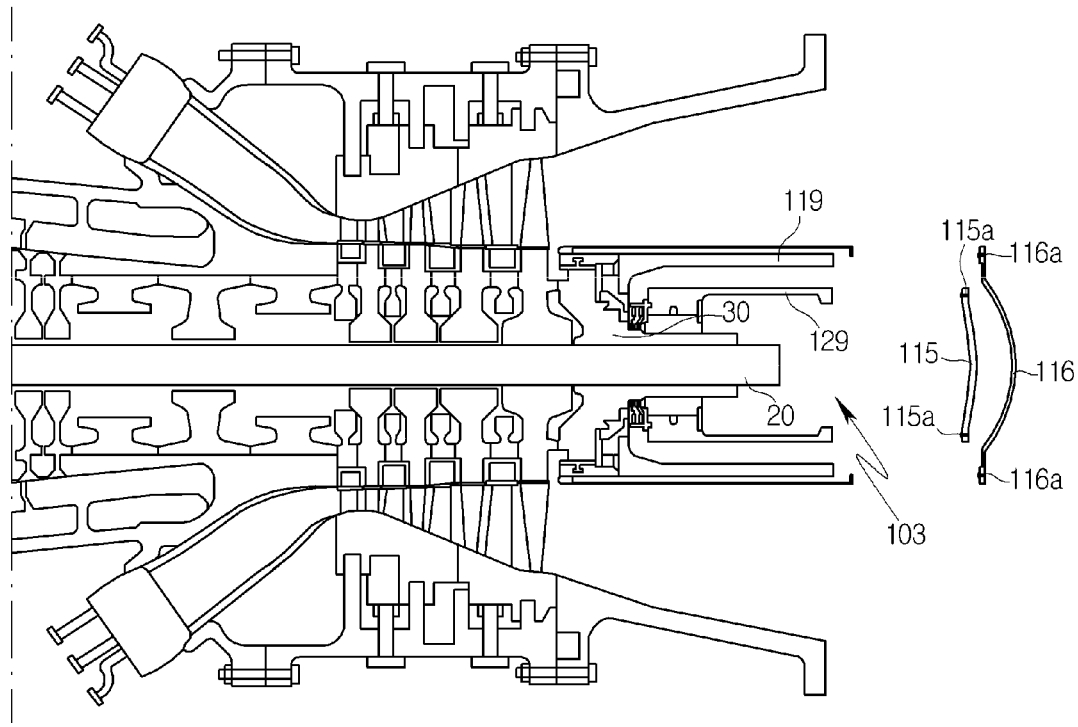

[FIG. 42]
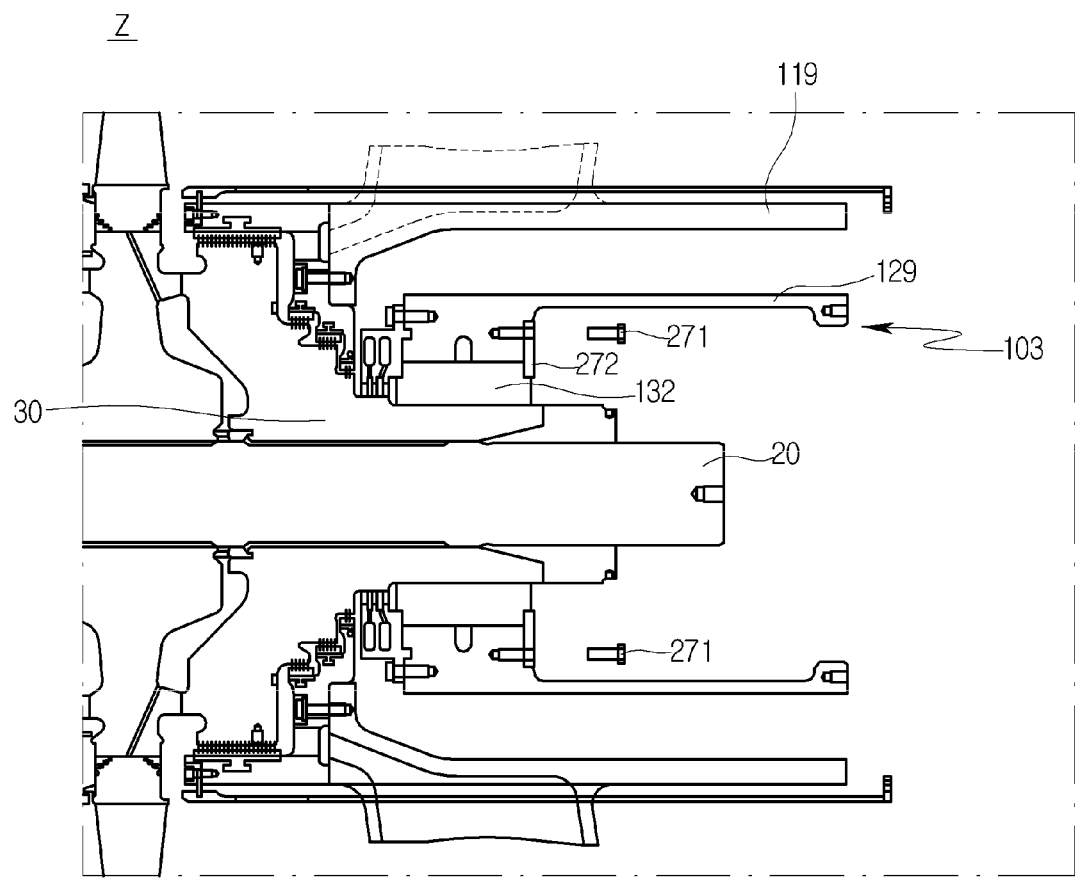

[FIG. 43]
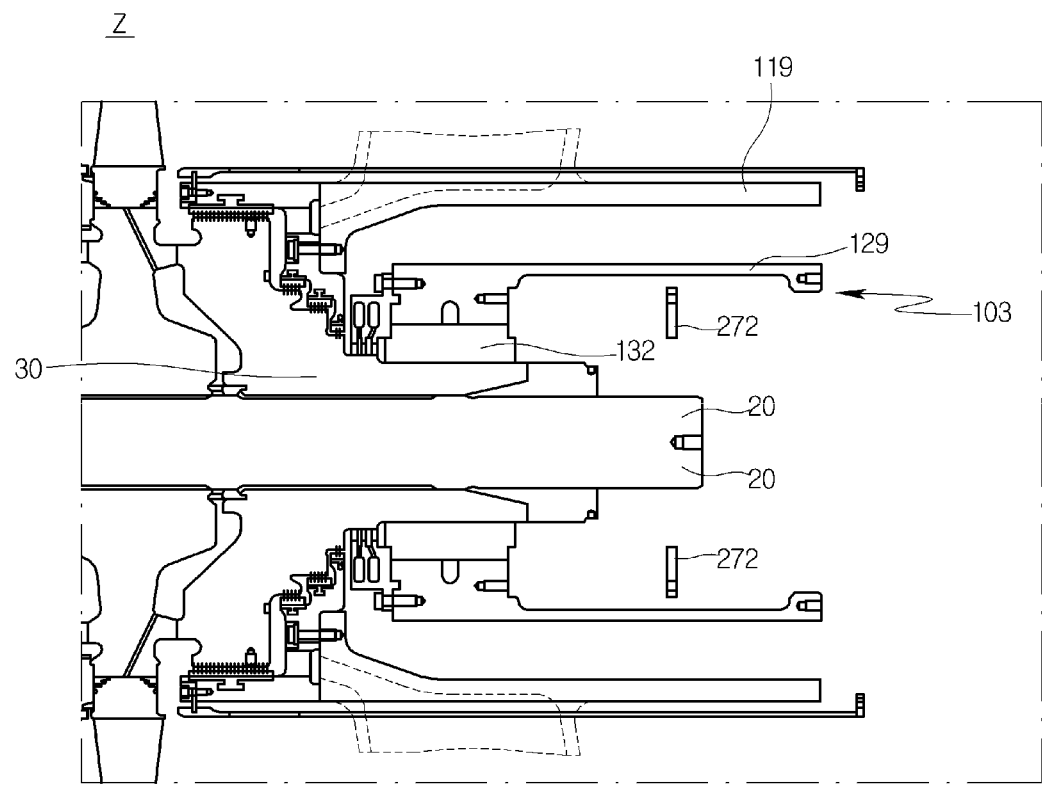

[FIG. 44]
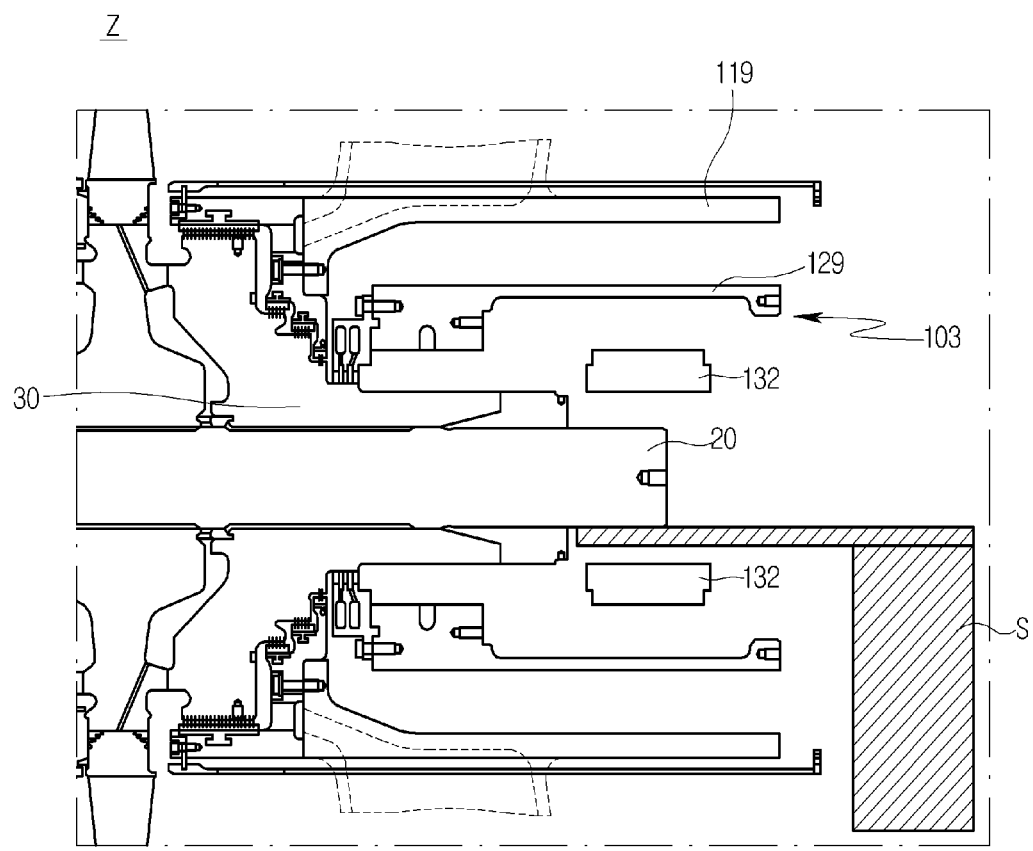

METHOD OF ASSEMBLING AND DISASSEMBLING GAS TURBINE AND GAS TURBINE ASSEMBLED THEREBY

CROSS-REFERENCE TO RELATED APPLICATIONS

This application claims priority to Korean Patent Application No. 10-2017-0081722, filed on Jun. 28, 2017, the disclosure of which is incorporated herein by reference in its entirety.

BACKGROUND OF THE INVENTION

Field of the Invention

Exemplary embodiments of the present invention relate to a method of assembling and disassembling a gas turbine and a gas turbine assembled thereby, and more particularly, to a method in which a variety of assembly and disassembly processes of a turbine section are provided, for implementation depending on the particular circumstances.

Description of the Related Art

In general, turbines are power generation apparatuses that convert thermal energy of fluid, such as gas or steam, into rotational force as mechanical energy. A turbine includes a rotor having a plurality of buckets or blades, which are axially rotated by the force of the fluid, and a stator installed to surround the rotor and having a plurality of diaphragms or vanes.

Among these turbines, a gas turbine includes a compressor section, a combustor section, and a turbine section. In the gas turbine, outside air is sucked and compressed by the rotation of the compressor section and is then transferred to the combustor section, and combustion is performed by mixing the compressed air with fuel in the combustor section. The high-temperature, high-pressure gas generated in the combustor section serves to rotate the rotary shaft of the turbine to drive a generator while passing through the turbine section.

Each manufacturer typically assembles and disassembles a gas turbine in a single, fixed manner. Accordingly, when there is a need for replacement or maintenance of specific components, the disassembly and reassembly processes of the gas turbine are carried out in the same fixed manner.

However, this one-size-fits-all assembly and disassembly process is problematic in that it is ineffective to cope with various situations, whereby workload may be increased.

SUMMARY OF THE INVENTION

Accordingly, the present invention has been made in view of the above-mentioned problem. It is therefore an object of the present invention to provide various methods of disassembling and assembling a turbine section to enable disassembly and assembly processes to be carried out according to circumstances, thereby improving work efficiency related to maintenance and reducing time and cost.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In order to accomplish the above objects, exemplary embodiments of the present invention provide a method of assembling and disassembling a gas turbine and a gas turbine assembled thereby.

In accordance with one aspect of the present invention, there is provided a method of disassembling a first-stage blade assembly and a first-stage vane assembly of a turbine section from a gas turbine. The method may include sequential steps of (a) disassembling a combustor assembly; (b) disassembling a first-stage vane assembly; and (c) disassembling a first-stage blade assembly.

The step (a) may include sequential steps of (a1) disassembling a combustor head assembly and a liner from a combustor mounting portion; and (a2) disassembling a transition piece from an upper front vane carrier assembly.

The step (b) may include (b1) disassembling an inner seal carrier bolt from a first-stage U-ring.

The step (b) may further include (b2) disassembling a first-stage vane from the first-stage U-ring.

The step (b) may further include sequential steps of (b3) disassembling an inner seal carrier bolt; and (b4) disassembling a first-stage vane inner fixture from the first-stage U-ring.

The step (b) may further include sequential steps of (b5) disassembling a first-stage vane inner fixture; and (b6) disassembling an outer seal carrier bolt from an upper front vane carrier assembly.

After the step (b6), the step (b) may further include (b7) disassembling a first-stage vane outer fixture from the upper front vane carrier assembly.

The step (b) may further include disassembling the first-stage U-ring from a casing support between the disassembling a first-stage vane outer fixture and the disassembling a first-stage vane.

The step (c) may include (c1) disassembling a first-stage ring segment from an upper front vane carrier assembly.

The step (c) may further include (c2) disassembling a first-stage blade from a turbine disk.

The step (c1) may include (c1a) disassembling a first-stage ring segment fixing bolt from the upper front vane carrier assembly.

The step (c1) may further include (c1b) disassembling a first-stage ring segment fixture from the upper front vane carrier assembly.

In accordance with another aspect of the present invention, there is provided a method of disassembling a fourth-stage blade assembly of a turbine section from a gas turbine. The method may include sequential steps of (a) disassembling a diffuser loading slot from a rear diffuser; and (b) disassembling a fourth-stage blade assembly from a turbine disk.

The method may further include (a1) disassembling a diffuser seal loading slot from a thrust balance seal assembly, after the step (a).

The method may further include (a2) disassembling a loading slot of the thrust balance seal assembly from the thrust balance seal assembly, after the step (a).

The method may further include (a3) disassembling a loading slot of a fourth-stage blade seal ring from an upper rear vane carrier assembly, after the step (a2).

In accordance with another aspect of the present invention, there is provided a method of disassembling a rear bearing assembly of a turbine section from a gas turbine. The method may include sequential steps of (a) disassembling a rear diffuser cover from a rear diffuser; and (b) supporting one end of a rotor shaft and disassembling a rear bearing from a rotor shaft support.

The method may further include (a1) disassembling a rear bearing housing cover from a rear bearing housing, after the step (a).

The method may further include (a2) disassembling a rear bearing flange bolt from the rear bearing housing, after the step (a1).

The method may further include (a3) disassembling a rear bearing flange from the rear bearing housing, after the step (a3).

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic diagram of a turbine section for illustrating a method of disassembling and assembling a gas turbine according to various embodiments of the present invention;

FIGS. 2-15 are schematic diagrams of the turbine section of FIG. 1, in which a method according to a first embodiment of the present invention is shown in sequence, respectively, disassembling each of an upper turbine case (FIG. 2), a rear diffuser cover and a rear bearing housing cover (FIG. 3), an upper turbine frame and an upper thrust balance seal assembly (FIG. 4), a lower honeycomb seal (FIG. 5), an upper bearing housing and an upper oil seal housing (FIG. 6), a lower knife edge seal (FIG. 7), an upper rear bearing (FIG. 8), a combustor head assembly and a liner (FIG. 9), a transition piece (FIG. 10), an upper front vane carrier assembly (FIG. 11), a lower front vane carrier assembly (FIG. 12), an upper rear vane carrier assembly (FIG. 13), a lower rear vane carrier assembly (FIG. 14), and a blade assembly (FIG. 15);

FIGS. 16-23 are schematic diagrams of the turbine section of FIG. 1, in which a method according to a second embodiment of the present invention is shown in sequence, respectively, disassembling each of an upper turbine case (FIG. 16), a combustor head assembly and a liner (FIG. 17), a transition piece (FIG. 18), an upper front vane carrier assembly (FIG. 19), a lower front vane carrier assembly (FIG. 20), an upper rear vane carrier assembly (FIG. 21), a lower rear vane carrier assembly (FIG. 22), and a blade assembly (FIG. 23);

FIGS. 24-35 are schematic diagrams of the turbine section of FIG. 1, in which a method according to a third embodiment of the present invention is shown in sequence, respectively, disassembling each of a combustor head assembly and a liner (FIG. 24), a transition piece (FIG. 25), an inner seal carrier bolt (FIG. 26), a first-stage vane inner fixture (FIG. 27), an outer seal carrier bolt (FIG. 28), a first-stage vane outer fixture (FIG. 29), a first-stage vane (FIG. 30), a first-stage U-ring (FIG. 31), a first-stage ring segment fixing bolt (FIG. 32), a first-stage ring segment fixture (FIG. 33), a first-stage ring segment (FIG. 34), and a first-stage blade and a first-stage blade fixture (FIG. 35);

FIGS. 36-40 are schematic diagrams of the turbine section shown in FIG. 1, in which a method according to a fourth embodiment of the present invention is shown in sequence, respectively, disassembling each of a diffuser loading slot (FIG. 36), a diffuser seal loading slot (FIG. 37), a thrust balance seal assembly loading slot (FIG. 38), a fourth-stage blade seal ring loading slot (FIG. 39), the fourth-stage blade assembly (FIG. 40); and FIGS. 41-44 are schematic diagrams of the turbine section shown in FIG. 1, in which a method according to a fifth embodiment of the present invention is shown in sequence, respectively, disassembling each of a rear diffuser cover and a rear bearing housing cover (FIG. 41), a rear bearing flange bolt (FIG. 42), a rear bearing flange (FIG. 43), and a rear bearing (FIG. 44).

DESCRIPTION OF SPECIFIC EMBODIMENTS

Reference will now be made in detail to exemplary embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a method of assembling and disassembling a gas turbine and a gas turbine assembled thereby according to exemplary embodiments of the present invention will be described below in more detail with reference to the accompanying drawings.

Before describing the exemplary embodiments of the present invention, the structure of the gas turbine, which is an example of a turbomachine pertaining to the present invention, will be described. However, the present invention may also be applied to other gas turbines and should not be construed as limited to the structure set forth hereinafter.

The gas turbine pertaining to the present invention includes a compressor, a set of combustors, and a turbine as basic components, and a casing, which essentially corresponds to the gas turbine's body. The compressor is forwardly disposed inside the casing and the turbine is rearwardly disposed inside the casing, such that with respect to airflow directionality, the compressor section of the gas turbine has an upstream disposition and the gas turbine section of the gas turbine has a downstream disposition. The casing is provided with a set of channels through which the combustors are respectively connected between the compressor and the turbine, which forms a combustor section.

In order to produce power, outside air is introduced to the compressor section for an adiabatic compression process, the compressed air is introduced to the combustor section to be mixed with fuel for an isobaric combustion process, and the combustion gas is introduced to the turbine section for an adiabatic expansion process. The combustion gas, which generates power by passing through the turbine, is discharged from the gas turbine through an exhaust diffuser disposed in the rear of the casing.

At this time, the compressor and the turbine may be connected to each other by a single rotor shaft, or tie rod, and thus are configured to rotate integrally. This configuration is beneficial in terms of production cost and operation, since gas turbines generally employed in power plants are driven continuously.

Mounted to an outer circumferential surface of the rotor shaft in the compressor section are a plurality of disks axially arranged. A plurality of buckets are radially arranged, on each disk, in correspondence to rotor blades. The buckets may be coupled to a disk using an axial-type or a tangential-type coupling method, both of which are currently commercialized methods.

In the axial-type coupling method, the lower end of each bucket is dovetailed for coupling to a bucket mounting portion, provided on the periphery of the associated disk, by inserting the bucket dovetails into the bucket mounting portion in the axial direction of the rotor shaft. In the tangential-type coupling method, each bucket is fitted into and coupled to the bucket mounting portion in the circumferential direction of the rotor shaft.

An upper end of each bucket may be provided with a platform on which a blade is disposed. In this case, a plurality of disk-shaped diaphragms are fixedly arranged in rows on an inner circumferential surface of the casing, and a plurality of vanes or nozzles are mounted on each of the diaphragms in the radial direction. The rotor shaft passes through the center of each diaphragm. As the shaft rotates, creating a mutual rotation of the buckets and the vanes (or nozzles) disposed on the diaphragms, air introduced from outside the gas turbine is compressed between the vanes and the buckets. That is, combustion gas generated in the combustor section is expanded by mutual rotation of the turbine blades and the vanes (or nozzles) disposed on the diaphragms and is used to produce power in the turbine section.

The combustor section is disposed in the casing between the compressor section and the turbine section. In the combustor section, a plurality of combustors are arranged in cell form in the radial direction of the casing. Each combustor is configured to include components such as a combustor head assembly, a liner that defines a combustion chamber, a flow sleeve that guides the flow of air, and a transition piece that allows combustion gas to flow to the turbine section. The combustor head assembly includes a fuel injection nozzle, an ignition plug, and the like.

Air, which is compressed in and introduced from the compressor section, is mixed with fuel injected from the combustor section for combustion and then flows to the turbine section. The combustion gas having passed through the turbine section is discharged to the outside through the exhaust diffuser at the rear of the casing. Here, a gas turbine used in a combined generation system is configured such that the exhaust gas discharged from the exhaust diffuser is introduced to a steam turbine via heat exchangers for other power generation. In this case, the pressure and velocity of the exhaust gas discharged from the exhaust diffuser may be critical factors. Therefore, for smooth operation of the turbine, the exhaust gas must be introduced to the steam turbine at constant pressure and velocity.

Hereinafter, in the present invention, the non-rotational component such as a casing, a diaphragm, or a combustor may be referred to as a fixed unit or a stator, and the rotational component such as a rotor shaft, a tie rod, a compressor, or a turbine may be referred to as a rotating unit or a rotor.

According to the present invention, a gas turbine may be divided into a compressor section, a combustor section, and a turbine section as described above. FIG. 1 shows a turbine section 100 of a gas turbine arranged according to exemplary embodiments of the present invention and serves to illustrate a method of disassembling and assembling (reassembling) a gas turbine according to first to fifth embodiments of the present invention. As such, FIG. 1 illustrates the turbine section 100 of the gas turbine before its disassembly for maintenance or component replacement in accordance with the respective embodiments. In the present application, the disassembly and disassembling of a gas turbine component may refer to the component being removed from the remainder of the gas turbine or to decoupling the component and the remainder of the gas turbine.

FIG. 1 is a cross-sectional profile view, along a varying line through a gas turbine, and is thus a conceptualized representation of the relevant components under consideration. Cross-sectional areas X, Y, and Z relate specifically to the third, fourth, and fifth embodiments, respectively.

Table 1 relates to drawings pertaining to the first exemplary embodiment of the present invention.

TABLE 1

First Embodiment

| Drawing | Component(s) being disassembled and/or removed |
|---|---|
| FIG. 2 | upper turbine case 113 |
| FIG. 3 | rear diffuser cover 116, rear bearing housing cover 115 |
| FIG. 4 | upper turbine frame 118, upper thrust balance seal assembly 123 |
| FIG. 5 | lower honeycomb seal 126 |
| FIG. 6 | upper rear bearing housing 129, upper oil seal housing 130 |
| FIG. 7 | lower knife edge seal 134 |
| FIG. 8 | upper rear bearing 132 (journal bearing) |
| FIG. 9 | combustor head assembly 141a, liner 141b |
| FIG. 10 | transition piece 151 |
| FIG. 11 | upper front vane carrier assembly 155 |
| FIG. 12 | lower front vane carrier assembly 161 |
| FIG. 13 | upper rear vane carrier assembly 157 |
| FIG. 14 | lower rear vane carrier assembly 163 |
| FIG. 15 | blade assembly 170 |

Referring to FIGS. 1 to 15, the method of disassembling a gas turbine according to the first embodiment of the present invention is aimed at disassembling an entire turbine section 100 from a gas turbine. To this end, the method of disassembling the turbine section 100 from the gas turbine in the first embodiment of the present invention may include, in sequence, a step of disassembling an upper turbine case 113, a step of disassembling a rear diffuser assembly 102 and a rear bearing assembly 103, a step of disassembling a combustor assembly 140, a step of disassembling a vane assembly 153, and a step of disassembling a blade assembly 170.

For the disassembly of the entire turbine section 100, first, side flange bolts 111a and 111b are respectively removed from a combustor mounting portion 101 and a turbine frame 117 of a gas turbine casing, and vane carrier centering pins 112a and 112b are removed from vane carrier assemblies 155 and 157, as illustrated in FIG. 2. An upper turbine case 113 is disassembled from the vane carrier assemblies 155 and 157, the turbine frame 117, and the combustor mounting portion 101.

Next, as illustrated in FIGS. 3 to 8, the step of disassembling a rear diffuser assembly 102 and a rear bearing assembly 103 is performed.

Referring to FIG. 3, a flange blot 116a is first removed from a rear diffuser 119 to disassemble a rear diffuser cover 116. Then, a flange bolt 115a is removed from a rear bearing housing 129 to disassemble a rear bearing housing cover 115. The flange bolt 116a consists of a plurality of flange bolts arranged in the circumferential direction of the rear diffuser cover 116, and the flange bolt 115a consists of a plurality of flange bolts arranged in the circumferential direction of the rear bearing housing cover 115.

Next, referring to FIG. 4, bolts (not shown) are removed from an upper rear vane carrier assembly 157 to disassemble an upper turbine frame 118 connected integrally with the rear diffuser 119 by a strut (not shown). In this case, an upper thrust balance seal assembly 123 is mounted on the rear diffuser 119. Accordingly, the upper thrust balance seal assembly 123 may be disassembled from the rear diffuser 119 by removal of side flange bolts 121a and 121b from the rear diffuser 119. Here, an upper honeycomb seal 124 is disassembled from the turbine section 100 together with the upper thrust balance seal assembly 123.

Next, referring to FIG. 5, a lower honeycomb seal 126 is removed from a lower thrust balance seal housing 125b disposed at a position facing a labyrinth seal 127. Although only side cross-section of the lower honeycomb seal 126 is illustrated in an enlarged view of FIG. 5, the lower honeycomb seal 126 is circumferentially pushed from a lower honeycomb seal mounting portion 125a for disassembly since it has a semicircular shape.

Next, referring to FIG. 6, for disassembly of an upper rear bearing housing 129 and an upper oil seal housing 130, bolts (not shown) are removed from a rear bearing 132 seated on the outer peripheral surface of a rotor shaft support 30 for supporting one end of a rotor shaft 20.

Next, referring to FIG. 7, a lower knife edge seal 134 is disassembled from a lower oil seal housing 135. In this case, the lower knife edge seal 134 is circumferentially pushed from a mounting portion 135a of the lower oil seal housing 135 for disassembly since it has a semicircular shape.

Next, referring to FIG. 8, an upper rear bearing 132 is disassembled after bolts (not shown) are removed from the rotor shaft support 30. In this case, the upper rear bearing 132 may be a journal bearing.

Next, the step of disassembling a combustor assembly 140 is performed. Referring to FIG. 9, bolts (not shown) are removed from the combustor mounting portion 101 to disassemble a combustor head assembly 141a and a liner 141b. Although not illustrated in the drawings, components, such as a fuel line, a wire, an igniter (electronic control circuit), and a flame sensor, are disposed in the combustor head assembly 141a.

As illustrated in FIG. 10, bolts (not shown) are removed from an upper front vane carrier assembly 155 to disassemble a transition piece 151.

Next, as illustrated in FIG. 11, bolts (not shown) are removed from the upper rear vane carrier assembly 157 to disassemble the upper front vane carrier assembly 155. In this case, the upper front vane carrier assembly 155 may include first to third-stage vanes 154a, 154b, and 154c. Although not illustrated in the drawings, a U-seal is also disassembled.

Referring to FIG. 12, for disassembly of a lower front vane carrier assembly 161, bolts (not shown) are removed from a lower rear vane carrier assembly 163 and a vane carrier centering pin 40a is removed from a lower turbine case 40. In this case, the lower front vane carrier assembly 161 may include first to third-stage vanes 160a, 160b, and 160c. Although not illustrated in the drawings, a U-seal is also disassembled.

Next, as illustrated in FIG. 13, for disassembly of an upper rear vane carrier assembly 157, bolts (not shown) are removed from the contact portion between the semicircular lower rear vane carrier assembly 163 and the upper rear vane carrier assembly 157. In this case, the upper rear vane carrier assembly 157 includes a fourth-stage blade 165 formed thereon. Although not illustrated in the drawings, a U-seal is also disassembled.

Referring to FIG. 14, a vane carrier centering pin 40b is removed from the lower turbine case 40 to disassemble the lower rear vane carrier assembly 163. In this case, the lower rear vane carrier assembly 163 may include a fourth-stage vane 167. Although not illustrated in the drawings, a U-seal is also disassembled.

After the above steps are performed, finally, a blade fixture (not shown) is removed from a turbine disk 171, and a plurality of first to fourth-stage blades 170 arranged in the circumferential direction of the turbine disk 171 is disassembled, as illustrated in FIG. 15.

Through the above disassembly process of the entire turbine section 100, it is possible to more efficiently perform the maintenance of the turbine section or the replacement of the components thereof.

Here, the present invention may provide a gas turbine that includes a compressor section for compressing air introduced from the outside, a combustor section connected to the compressor section to mix the compressed air with fuel for combustion, and a turbine section connected to the combustor section and assembled in reverse order of the method of disassembling a turbine section.

Table 2 relates to drawings pertaining to the second exemplary embodiment of the present invention.

TABLE 2

| Second Embodiment | |
|---|---|
| Drawing | Component(s) being disassembled and/or removed |
| FIG. 16 | upper turbine case 113 |
| FIG. 17 | combustor head assembly 141a, liner 141b |
| FIG. 18 | transition piece 151 |
| FIG. 19 | upper front vane carrier assembly 155 |
| FIG. 20 | lower front vane carrier assembly 161 |
| FIG. 21 | upper rear vane carrier assembly 157 |
| FIG. 22 | lower rear vane carrier assembly 163 |
| FIG. 23 | blade assembly 170 |

Referring to FIGS. 1 and 16 to 23, the method of disassembling a gas turbine according to the second embodiment of the present invention is aimed at disassembling first to fourth-stage blade assemblies and first to fourth-stage vane assemblies of a turbine section 100 from a gas turbine. To this end, the method of disassembling a gas turbine according to the second embodiment of the present invention may include, in sequence, a step of disassembling an upper turbine case 113, a step of disassembling a combustor assembly 140, a step of disassembling a vane assembly 153, and a step of disassembling a blade assembly 170.

For the disassembly of the entire turbine section 100, first, side flange bolts 111a and 111b are respectively removed from a combustor mounting portion 101 and a turbine frame 117 of a gas turbine casing, and vane carrier centering pins 112a and 112b are removed from vane carrier assemblies 155 and 157, as illustrated in FIG. 16. Then, an upper turbine case 113 is disassembled from the vane carrier assemblies 155 and 157, the turbine frame 117, and the combustor mounting portion 101.

Next, the step of disassembling a combustor assembly 140 is performed. Referring to FIG. 17, bolts (not shown) are removed from the combustor mounting portion 101 to disassemble a combustor head assembly 141a and a liner 141b. Although not illustrated in the drawings, components, such as a fuel line, a wire, an igniter (electronic control circuit), and a flame sensor, are disposed in the combustor head assembly 141a.

As illustrated in FIG. 18, bolts (not shown) are removed from an upper front vane carrier assembly 155 to disassemble a transition piece 151.

Next, as illustrated in FIG. 19, bolts (not shown) are removed from an upper rear vane carrier assembly 157 to disassemble the upper front vane carrier assembly 155. In this case, the upper front vane carrier assembly 155 may include first to third-stage vanes 154a, 154b, and 154c. Although not illustrated in the drawings, a U-seal is also disassembled.

Referring to FIG. 20, for disassembly of a lower front vane carrier assembly 161, bolts (not shown) are removed from a lower rear vane carrier assembly 163 and a vane carrier centering pin 40a is removed from a lower turbine case 40. In this case, the lower front vane carrier assembly 161 may include first to third-stage vanes 160a, 160b, and 160c. Although not illustrated in the drawings, a U-seal is also disassembled.

Next, as illustrated in FIG. 21, for disassembly of an upper rear vane carrier assembly 157, bolts (not shown) are removed from the contact portion between the semicircular lower rear vane carrier assembly 163 and the upper rear vane carrier assembly 157. In this case, the upper rear vane carrier assembly 157 includes a fourth-stage blade 165 formed thereon. Although not illustrated in the drawings, a U-seal is also disassembled.

Referring to FIG. 22, a vane carrier centering pin 40b is removed from the lower turbine case 40 to disassemble the lower rear vane carrier assembly 163. In this case, the lower rear vane carrier assembly 163 may include a fourth-stage vane 167. Although not illustrated in the drawings, a U-seal is also disassembled.

After the above steps are performed, finally, a blade fixture (not shown) is removed from a turbine disk 171, and a plurality of first to fourth-stage blades 170 arranged in the circumferential direction of the turbine disk 171 is disassembled, as illustrated in FIG. 23.

Through the above disassembly process of first to fourth-stage blade assemblies and first to fourth-stage vane assemblies of the entire turbine section 100, it is possible to more efficiently perform the maintenance of the turbine section or the replacement of the components thereof.

Here, the present invention may provide a gas turbine that includes a compressor section for compressing air introduced from the outside, a combustor section connected to the compressor section to mix the compressed air with fuel for combustion, and a turbine section connected to the combustor section and assembled in reverse order of the method of disassembling first to fourth-stage blade assemblies and first to fourth-stage vane assemblies of a turbine section.

Table 3 relates to drawings pertaining to the third exemplary embodiment of the present invention.

TABLE 3

| Third Embodiment | |
|---|---|
| Drawing | Component(s) being disassembled and/or removed |
| FIG. 24 | combustor head assembly 141a, liner 141b |
| FIG. 25 | transition piece 151 |
| FIG. 26 | inner seal carrier bolt 211 |
| FIG. 27 | first-stage vane inner fixture 212 |
| FIG. 38 | outer seal carrier bolt 213 |
| FIG. 29 | first-stage vane outer fixture 214 |
| FIG. 30 | first-stage vane 215 |
| FIG. 31 | first-stage U-ring 216 |
| FIG. 32 | first-stage ring segment fixing bolt 217 |
| FIG. 33 | first-stage ring segment fixture 218 |

TABLE 3-continued

| Third Embodiment | |
|---|---|
| Drawing | Component(s) being disassembled and/or removed |
| FIG. 34 | first-stage ring segment 219 |
| FIG. 35 | first-stage blade 233, first-stage blade fixture 231 |

Referring to FIGS. 1 and 24 to 35, the third embodiment of the present invention is aimed at efficiently disassembling a first-stage blade assembly 230 and a first-stage vane assembly 210 of a turbine section 100 from a gas turbine. To this end, the method of disassembling a gas turbine may include, in sequence, a step of disassembling a combustor assembly, a step of disassembling a first-stage vane assembly, and a step of disassembling a first-stage blade assembly.

First, referring to FIG. 24, bolts (not shown) are removed from a combustor mounting portion 101 to disassemble a combustor head assembly 141a and a liner 141b in the step of disassembling a combustor assembly. Although not illustrated in the drawings, components, such as a fuel line, a wire, an igniter (electronic control circuit), and a flame sensor, are disposed in the combustor head assembly 141a.

As illustrated in FIG. 25, bolts (not shown) are removed from an upper front vane carrier assembly 155 to disassemble a transition piece 151.

FIGS. 26 to 35 are enlarged views of the area X in FIG. 1, which is a portion of the turbine section in which the first-stage blade assembly 230 and the first-stage vane assembly 210 are disposed.

Before the disassembly of the first-stage blade assembly 230, the first-stage vane assembly 210 must first be disassembled to avoid interference. To this end, first, as shown in FIG. 26, an inner seal carrier bolt 211 for fixing a first-stage vane inner fixture 212 and a first-stage U-ring 216 to a casing support 50 is first disassembled.

Next, referring to FIG. 27, the first-stage vane inner fixture 212 is separated from the first-stage U-ring 216. With the first-stage vane inner fixture 212 thus detached, the size of the first-stage vane 215 permits its disassembly in the mounting direction of the combustor.

Next, referring to FIG. 28, an outer seal carrier bolt 213 is removed from a first-stage vane outer fixture 214 such that the first-stage vane outer fixture 214 may be disassembled from an upper front vane carrier assembly 155. The upper front vane carrier assembly 155 may include first to third-stage vanes formed thereon. Among them, the first-stage vane 215 is disposed closest to the combustor mounting portion.

Next, referring to FIG. 29, the first-stage vane outer fixture 214 is disassembled from the upper front vane carrier assembly 155. At this time, the first-stage vane 215 is exposed in the direction of the combustor mounting portion.

Next, as illustrated in FIG. 30, the first-stage vane 215 is disassembled from the first-stage U-ring 216 and the upper front vane carrier assembly 155 in the direction of the combustor mounting portion.

Next, as illustrated in FIG. 31, the first-stage U-ring 216 is disassembled from the casing support 50, to thereby create access for the disassembly of the first-stage blade assembly 230.

Next, as illustrated in FIG. 32, a first-stage ring segment fixing bolt 217 is first disassembled to disassemble a first-stage ring segment fixture 218 and a first-stage ring segment 219 from the upper front vane carrier assembly 155.

Next, referring to FIG. 33, the first-stage ring segment fixture 218 is disassembled from the side of the first-stage ring segment 219, and as illustrated in FIG. 34, the first-stage ring segment 219 disposed at a position facing a first-stage blade is disassembled in the direction of the combustor mounting portion.

Next, as illustrated in FIG. 35, a plurality of first-stage blade fixtures 231 arranged circumferentially is removed from a turbine disk 60, and the first-stage blade assembly 230 including a first-stage blade 233 is disassembled in the direction of the combustor mounting portion.

Through the above disassembly process of the first-stage vane assembly 210 and the first-stage blade assembly 230 of the turbine section 100, it is possible to more efficiently perform the maintenance of the first-stage vane assembly 210 and the first-stage blade assembly 230 of the turbine section or the replacement of the components thereof.

Here, the present invention may provide a gas turbine that includes a compressor section for compressing air introduced from the outside, a combustor section connected to the compressor section to mix the compressed air with fuel for combustion, and a turbine section connected to the combustor section and assembled in reverse order of the method of disassembling a first-stage vane assembly and a first-stage blade assembly of a turbine section.

Table 4 relates to drawings pertaining to the fourth exemplary embodiment of the present invention.

TABLE 4

Fourth Embodiment

| Drawing | Component(s) being disassembled and/or removed |
| --- | --- |
| FIG. 36 | diffuser loading slot 251 |
| FIG. 37 | diffuser seal loading slot 252 |
| FIG. 38 | thrust balance seal assembly loading slot 253 |
| FIG. 39 | fourth-stage blade seal ring loading slot 256 |
| FIG. 40 | fourth-stage blade assembly 240 |

Referring to FIGS. 1 and 36 to 40, the fourth embodiment of the present invention is aimed at efficiently disassembling a fourth-stage blade assembly 240 of a turbine section 100 from a gas turbine. To this end, the method of disassembling a gas turbine may include, in sequence, a step of disassembling a diffuser loading slot 251 and a step of disassembling a fourth-stage blade assembly 240.

FIGS. 36 to 40 are enlarged views of the area Y in FIG. 1, which is a portion of the turbine section in which the fourth-stage blade assembly 240 is disposed.

Referring to FIG. 36, for the disassembly of the fourth-stage blade assembly 240 from the turbine section 100, a diffuser loading slot 251, which is coupled to a diffuser seal loading slot 252 on a rear diffuser 119, is first disassembled.

As illustrated in FIG. 37, the diffuser seal loading slot 252 is then disassembled from a thrust balance seal assembly 123.

Next, referring to FIG. 38, a loading slot 253 of the thrust balance seal assembly 123, to which a honeycomb seal 253a facing a rotor shaft support 30 having a labyrinth seal disposed therein is mounted, is disassembled. Thus, the fourth-stage blade assembly 240 is afforded space at the inward end of the fourth-stage blade assembly 240 for its disassembly in the direction of the rear diffuser 119.

Next, referring to FIG. 39, a loading slot 256 of an annular fourth-stage blade seal ring, which is formed in an upper rear vane carrier assembly 157, is disassembled. Thus, the fourth-stage blade assembly 240 is afforded space at the outward end of the fourth-stage blade assembly 240 for its disassembly in the direction of the rear diffuser 119.

Then, as illustrated in FIG. 40, a fourth-stage blade fixture 241 is detached from a turbine disk 70, and the fourth-stage blade assembly 240 including a fourth-stage blade 243 is disassembled in the direction of the rear diffuser 119.

Through the above disassembly process of the fourth-stage blade assembly 240 of the turbine section 100, it is possible to more efficiently perform the maintenance of the fourth-stage blade assembly 240 of the turbine section 100 or the replacement of the components thereof.

Here, the present invention may provide a gas turbine that includes a compressor section for compressing air introduced from the outside, a combustor section connected to the compressor section to mix the compressed air with fuel for combustion, and a turbine section connected to the combustor section and assembled in reverse order of the method of disassembling a fourth-stage blade assembly of a turbine section.

Table 5 relates to drawings pertaining to the fifth exemplary embodiment of the present invention.

TABLE 5

Fifth Embodiment

| Drawing | Component(s) being disassembled and/or removed |
| --- | --- |
| FIG. 41 | rear diffuser cover 116, rear bearing housing cover 115 |
| FIG. 42 | rear bearing flange bolt 271 |
| FIG. 43 | rear bearing flange 272 |
| FIG. 44 | rear bearing 132 (with rotor shaft rear end support S) |

Referring to FIGS. 1 and 41 to 44, the fifth embodiment of the present invention is aimed at efficiently disassembling a rear bearing assembly 103 of a turbine section 100 from a gas turbine. To this end, the method of disassembling a gas turbine may include, in sequence, a step of disassembling a rear diffuser cover 116 and a step of supporting a rear end of a rotor shaft 20 and disassembling a rear bearing assembly 103.

First, as illustrated in FIG. 41, a rear diffuser cover is disassembled after removal of flange bolts, and a rear bearing housing cover is disassembled after removal of flange bolts. That is, a side flange bolt 116a is removed from a rear diffuser 119 to disassemble a rear diffuser cover 116. Then, a side flange bolt 115a is removed from a rear bearing housing 129 to disassemble a rear bearing housing cover 115. Here, the flange bolt 116a consists of a plurality of flange bolts arranged around the circumference of the rear diffuser cover 116, and the flange bolt 115a consists of a plurality of flange bolts arranged around the circumference of the rear bearing housing cover 115.

FIGS. 42 to 44 are enlarged views of the area Z in FIG. 1, which is a portion of the turbine section in which the rear bearing assembly 103 is disposed.

Referring to FIG. 42, for the disassembly of a rear bearing flange 272 fixing a rear bearing 132, a rear bearing flange bolt 271 is disassembled from a rear bearing housing 129.

As illustrated in FIG. 43, the annular rear bearing flange 272, which fixes the rear bearing housing 129 and the rear bearing 132 such that they are in contact with each other, is disassembled.

Referring to FIG. 44, the disassembly of the rear bearing 132 is completed by supporting one end of the rotor shaft 20 with a support beam S and disassembling the rear bearing 132 from the rotor shaft support 30.

Through the above disassembly process of the rear bearing assembly 103 of the turbine section 100, it is possible to more efficiently perform the maintenance of the rear bearing assembly 103 of the turbine section 100 or the replacement of the components thereof.

Here, the present invention may provide a gas turbine that includes a compressor section for compressing air introduced from the outside, a combustor section connected to the compressor section to mix the compressed air with fuel for combustion, and a turbine section connected to the combustor section and assembled in reverse order of the method of disassembling a rear bearing assembly of a turbine section.

As described above in accordance with the present invention, various methods of disassembling and assembling a turbine section can be utilized in response to a situation where a worker intends to disassemble and reassemble the turbine section or to maintain the specific components in the turbine section, thereby improving the work efficiency related to the disassembly, assembly, or maintenance and reducing time and cost.

While the method of assembling and disassembling a gas turbine and the gas turbine assembled thereby according to the present invention have been described with respect to the specific embodiments, it will be apparent to those skilled in the art that various changes and modifications may be made without departing from the spirit and scope of the invention as defined in the following claims.

What is claimed is:

1. A method of disassembling a first-stage blade assembly and a first-stage vane assembly of a turbine section from a gas turbine, the method comprising sequential steps of:
   (a) disassembling a combustor assembly to expose the first-stage vane assembly in a direction of a combustor mounting portion;
   (b) disassembling the first-stage vane assembly; and
   (c) disassembling the first-stage blade assembly,
   wherein the first-stage vane assembly includes a casing support disposed on a radially inner side of the first-stage vane assembly, a first-stage vane inner fixture, a first-stage U-ring, and an inner seal carrier bolt for fixing the first-stage vane inner fixture and the first-stage U-ring to the casing support;
   wherein the first-stage vane inner fixture and the first-stage U-ring are arranged in an axial direction of the turbine section between a bolt head of the inner seal carrier bolt and a radially protruding flange of the casing support, the first-stage vane inner fixture is disposed toward the bolt head, the first-stage U-ring is disposed toward the radially protruding flange, and each of the first-stage vane inner fixture and the first-stage U-ring has a surface that faces radially inward and is configured to be seated on a radially outer side of the casing support; and
   wherein the step (b) comprises (b1) disassembling the inner seal carrier bolt from the first-stage U-ring by removing the inner seal carrier bolt in the direction of the combustor mounting portion, the step (b1) carried out by the first-stage U-ring remaining seated on the casing support after completion of the step (b1).

2. The method according to claim 1, wherein the step (a) comprises sequential steps of:
   (a1) disassembling a combustor head assembly and a liner from the combustor mounting portion; and
   (a2) disassembling a transition piece from an upper front vane carrier assembly.

3. The method according to claim 1,
   wherein the first-stage U-ring includes first and second protrusions formed on an axial portion that is seated on the radially outer side of the casing support, the axial portion having an upstream end and a downstream end, the first protrusion extending from the upstream end in a radial direction of the turbine section and the second protrusion extending from the downstream end in the radial direction;
   wherein the first protrusion includes an axially facing surface configured to receive an axially facing surface of the first-stage vane inner fixture; and
   wherein the step (b) further comprises:
   (b2) disassembling the inner seal carrier bolt from the first-stage vane inner fixture such that the axially facing surface of the first-stage vane inner fixture is separated from the axially facing surface of the first protrusion of the first-stage U-ring seated on the radially outer side of the casing support.

4. The method according to claim 1, wherein the step (b) further comprises:
   (b3) disassembling a first-stage vane of the first-stage vane assembly from the first-stage U-ring seated on the radially outer side of the casing support.

5. The method according to claim 4,
   wherein the first-stage vane includes a radially outer end having an axially facing surface for receiving a first-stage vane outer fixture of the first-stage vane assembly;
   wherein the first-stage vane outer fixture includes radially inner and outer ends, the radially inner end configured to retain the first-stage vane and the radially outer end configured to be seated in a recess formed in an axially facing surface of an upper front vane carrier assembly disposed at the radially outer end of the first-stage vane;
   wherein the first-stage vane assembly includes an outer seal carrier bolt for fixing the first-stage vane outer fixture in the recess of the upper front vane carrier assembly;
   wherein the step (b3) comprises sequential steps of:
   (b3a) disassembling the outer seal carrier bolt from the upper front vane carrier assembly in the direction of the combustor mounting portion; and
   (b3b) disassembling the first-stage vane outer fixture from the upper front vane carrier assembly in the direction of the combustor mounting portion.

6. The method according to claim 4, wherein the step (b) further comprises:
   disassembling the first-stage U-ring from the casing support between the step (b2) and the step (b3).

7. The method according to claim 1, wherein the step (c) comprises:
   (c1) disassembling a first-stage ring segment from an upper front vane carrier assembly.

8. The method according to claim 7, wherein the step (c) further comprises:
   (c2) disassembling a first-stage blade from a turbine disk.

9. The method according to claim 7, wherein the step (c1) comprises:
   (c1a) disassembling a first-stage ring segment fixing bolt from the upper front vane carrier assembly.

10. The method according to claim 9, wherein the step (c1) further comprises:
    (c1b) disassembling a first-stage ring segment fixture from the upper front vane carrier assembly.

* * * * *